(12) United States Patent
Liu

(10) Patent No.: US 10,516,622 B2
(45) Date of Patent: Dec. 24, 2019

(54) SPEECH TRANSMISSION METHOD AND APPARATUS AND SPEECH SERVICE SYSTEM

(71) Applicant: TENCENT TECHNOLOGY (SHENZHEN) COMPANY LIMITED, Shenzhen, Guangdong (CN)

(72) Inventor: Qiuge Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 373 days.

(21) Appl. No.: 15/177,478

(22) Filed: Jun. 9, 2016

(65) Prior Publication Data
US 2016/0294717 A1 Oct. 6, 2016

Related U.S. Application Data

(63) Continuation of application No. PCT/CN2015/072378, filed on Feb. 6, 2015.

(30) Foreign Application Priority Data

Dec. 9, 2013 (CN) .......................... 2013 1 0661738

(51) Int. Cl.
*H04L 12/801* (2013.01)
*H04L 29/06* (2006.01)

(52) U.S. Cl.
CPC ............ *H04L 47/34* (2013.01); *H04L 65/602* (2013.01)

(58) Field of Classification Search
None
See application file for complete search history.

(56) References Cited

U.S. PATENT DOCUMENTS 5,805,153 A 9/1998 Nielsen
2002/0102999 A1* 8/2002 Maggenti ............ H04L 12/1822
455/518

(Continued)

FOREIGN PATENT DOCUMENTS

CN 1513252 A 7/2004
CN 1902865 A 1/2007

(Continued)

OTHER PUBLICATIONS

International Search Report for App. No. PCT/CN2015/072378 dated May 6, 2015.

(Continued)

*Primary Examiner* — Adnan Baig
(74) *Attorney, Agent, or Firm* — Morgan, Lewis & Bockius LLP

(57) ABSTRACT

A speech transmission method and apparatus include receiving at least one speech request packet sequentially sent by a terminal. Each speech request packet carries one speech data segment of the speech stream, an offset position, and a data length. The method includes generating a speech response packet corresponding to the speech request packet according to the speech request packet and other received speech request packets corresponding to the speech stream. The speech response packet carries an expected offset position and an expected data length. The method includes feeding back the speech response packet to the terminal, so that the terminal can make a determination for sending the next speech request packet according to the speech response packet.

17 Claims, 10 Drawing Sheets

(56) References Cited

U.S. PATENT DOCUMENTS

| | | | |
|---|---|---|---|
| 2002/0181506 A1 | 12/2002 | Loguinov | |
| 2005/0102371 A1 | 5/2005 | Aksu | |
| 2009/0171659 A1* | 7/2009 | Pearce | G10L 15/24 |
| | | | 704/235 |
| 2009/0259763 A1 | 10/2009 | Karlsson | |
| 2010/0111110 A1* | 5/2010 | Wang | H04L 1/0071 |
| | | | 370/474 |
| 2012/0272281 A1 | 10/2012 | Ha et al. | |
| 2014/0064119 A1* | 3/2014 | Iizuka | H04L 43/0829 |
| | | | 370/252 |

FOREIGN PATENT DOCUMENTS

| | | |
|---|---|---|
| CN | 101272519 A | 9/2008 |
| CN | 101699840 A | 4/2010 |
| CN | 101911064 A | 12/2010 |

OTHER PUBLICATIONS

Taiwan Office Action for App. No. 1052056174001 dated Aug. 10, 2016, and an English concise explanation of relevance thereof.
Yang, Weiru "Chapter 10 of TCP Agreement", http://dns2.asia.edu.tw/~wzyang/slides/info_net/info_B/CH1OTCP.pdf.
International Preliminary Report for App. No. PCPCN2015/072378 dated Jun. 23, 2016.

\* cited by examiner

SPEECH TRANSMISSION METHOD AND APPARATUS AND SPEECH SERVICE SYSTEM

CROSS-REFERENCE TO RELATED APPLICATIONS

This application is a continuation of International Application No. PCT/CN2015/072378, filed on Feb. 6, 2015. This application claims the benefit and priority of Chinese Application No. 201310661738.8, filed Dec. 9, 2013. The entire disclosures of each of the above applications are incorporated herein by reference.

FIELD

The present disclosure relates to communication technology field, and to speech transmission.

BACKGROUND

This section provides background information related to the present disclosure which is not necessarily prior art.

As speech service technology matures and progresses, many applications provide the functionality of speech service. A speech service system typically includes a terminal and a server.

In speech recognition, for example, a terminal sends a server a speech request which carries speech data to be recognized. Correspondingly, after recognizing the speech data, the server feeds back a speech response carrying a recognition result to the terminal. In order to shorten the response time of the server for the speech request, streaming is a desirable mode for speech transmission. Through streaming, the transmission and recognition of a speech stream is not completed by one speech request, but by dividing the entire speech stream into a number of pieces of speech data segments according to certain rules, and when the user talks, the terminal, at the same time, begins to send the speech requests carrying the speech data segments one by one to the server for speech recognition. Thus, multiplexing is performed for talk time and time for transmitting the speech between the terminal and the server, i.e. when the user begins to talk, the server begins to perform speech recognition, thus the response time of the server for the speech requests is significantly shortened.

SUMMARY

This section provides a general summary of the disclosure, and is not a comprehensive disclosure of its full scope or all of its features.

The embodiments of the present disclosure provide a speech transmission method and apparatus and a speech service system, to improve the accuracy of processing the speech stream, or even where the speech stream cannot be processed during the speech transmission due to packet loss, duplication, and disorder. The technical approaches are as follow.

According to a first aspect, a speech transmission method is provided and the method includes:

receiving at least one speech request packet sequentially sent by a terminal, wherein each speech request packet carries one speech data segment of a speech stream, an offset position of the speech data segment in the speech stream, and a data length of the speech data segment;

for each speech request packet, generating a speech response packet corresponding to the speech request packet according to the speech request packet and other received speech request packets corresponding to the speech stream, wherein the speech response packet carries an expected offset position and an expected data length, wherein the expected offset position is the expected offset position in the speech stream of a speech data segment in a next speech request packet that is received by a server, and the expected data length is the expected length of the data of the speech data segment in the next speech request packet that is received by the server; and feeding back the speech response packet to the terminal, so that the terminal can make a determination for sending the next speech request packet according to the speech response packet.

According to a second aspect, a speech transmission method is provided, and the method includes:

sequentially sending a server at least one speech request packet, wherein each speech request packet carries one speech data segment of the speech stream, an expected offset position of the speech data segment in the speech stream, and a data length of the speech data segment;

receiving a speech response packet that is sent by the server and corresponds to the speech request packet, wherein the speech response packet is generated by the server according to the speech request packet and other received speech request packets corresponding to the speech stream; the speech response packet carries the expected offset position and the expected data length, wherein the expected offset position is the expected offset position in the speech stream of a speech data segment in a next speech request packet that is received by the server, and the expected data length is the expected length of the data of the speech data segment in the next speech request packet that is received by the server; and making a determination for sending the next speech request packet according to the speech response packet.

According to a third aspect, a speech transmission apparatus is provided, and the apparatus includes:

a request receiving module, adapted to receive at least one speech request packet sequentially sent by a terminal, wherein each speech request packet carries one speech data segment of the speech stream, an offset position of the speech data segment in the speech stream, and a data length of the speech data segment;

a response generating module, adapted to, for each speech request packet, generate a speech response packet corresponding to the speech request packet according to the speech request packet and other received speech request packets corresponding to the speech stream, wherein the speech response packet carries the expected offset position and the expected data length, wherein the expected offset position is the expected offset position, in the speech stream, of the speech data segment in a next speech request packet that is received by the server, and the expected data length is the expected length of the data of the speech data segment in the next speech request packet that is received by the server; and a response feedback module, adapted to feed back the speech response packet to the terminal, so that the terminal can make a determination for sending the next speech request packet according to the speech response packet.

According to a fourth aspect, a speech transmission apparatus is provided, and the apparatus includes:

a request sending module, adapted to sequentially send a server at least one speech request packet, wherein each speech request packet carries one speech data segment of the speech stream, an expected offset position of the speech data segment in the speech stream, and a data length of the speech data segment;

a response receiving module, adapted to receive the speech response packet that is sent by the server and corresponds to the speech request packet, wherein the speech response packet is generated by the server according to the speech request packet and other received speech request packets corresponding to the speech stream, the speech response packet carries the expected offset position, and the expected data length, wherein the expected offset position is the expected offset position, in the speech stream, of a speech data segment in a next speech request packet that is received by the server; and the expected data length is the expected length of the data of the speech data segment in the next speech request packet that is received by the server; and a request determination module, adapted to make a determination for sending the next speech request packet according to the speech response packet.

According to a fourth aspect, a speech service system is provided, which includes a server and a terminal. The server comprises the speech transmission apparatus according to the third aspect and the terminal comprises the speech transmission apparatus according to the fourth aspect.

Further areas of applicability will become apparent from the description provided herein. The description and examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to more clearly illustrate the technical approaches of the present disclosure, hereinafter, the drawings used in the descriptions of the embodiments will be simply described. The following described drawings are only some embodiments of the present disclosure, and those with ordinary skill in the art can obtain other drawings based on these drawings without any creative effort.

Corresponding reference numerals indicate corresponding parts throughout the several views of the drawings.

DETAILED DESCRIPTION

Example embodiments will now be described more fully with reference to the accompanying drawings.

Figure 1:
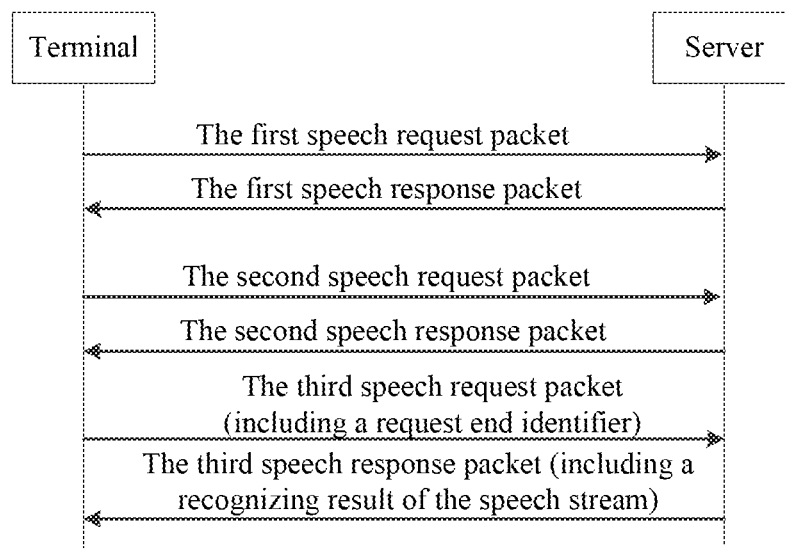
FIG. 1 is a flow chart of a typical speech transmission between a terminal and a server under a streaming transmission mode.

FIG. 1 shows a flowchart of a speech transmission between a terminal and a server under a typical streaming transmission mode. In the process of recognizing a speech stream, the speech stream is divided into three speech data segments. The terminal sends one speech request packet, including one speech data segment to the server, each time, namely the terminal sends a total of three speech request packets to the server three times, and the third speech request packet contains a request end identifier indicting an end of the request. Correspondingly, the server feeds back one speech response packet to the terminal each time when receiving the speech request packet, namely the server feeds back a total of three speech response packets to the terminal three times, and the third speech response packet contains recognition results for the entire speech stream.

In the implementation of the present disclosure, the inventors have found the following issues in the above technique. With the popularity of mobile terminals, since the mobile terminals use a mobile network or a wireless network and the network environment of the mobile network or the wireless network can be relatively poor, packet loss, duplication and disorder occur when a speech transmission is performed between the mobile terminal and the server under the streaming transmission mode, which will result in t inaccurate processing results of the speech stream or the inability to process the speech stream.

In order to make the goal, the technical methods, and the benefits of the present disclosure more apparent, hereinafter, embodiments of the present disclosure will be described in further detail in conjunction with the drawings.

Figure 2:
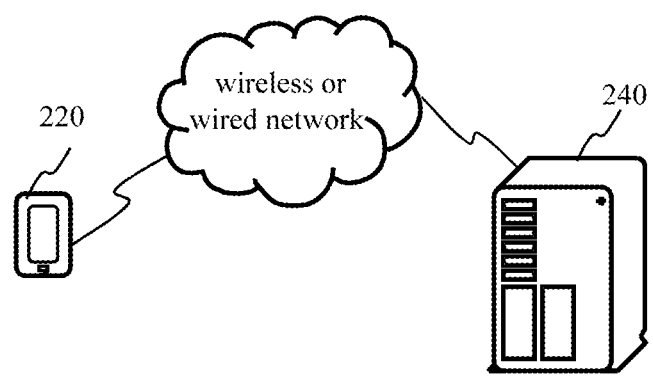
FIG. 2 is a diagram illustrating an implementation environment for a speech transmission method according to various embodiments.

FIG. 2 is a diagram illustrating an implementation environment for a speech transmission method according to various embodiments of the present disclosure. The implementation environment comprises a terminal 220 and a server 240. The terminal 220 may be a mobile phone, a tablet computer, an e-book reader, a MP3 (Moving Picture Experts Group Audio Layer III, motion picture compression standard audio expert level 3) player, a MP4 (Moving Picture Experts Group Audio Layer IV, dynamic image compression expert standard audio level 3) player, a portable laptop, a desktop computer, etc. The terminal 220 and the server 240 may be connected through a wireless network or wired network. The server 240 may be a server, a server cluster consisting of several servers, or a cloud computing service center.

The speech server 240 may also include a speech access device (not shown in FIG. 2), and the terminal 220 and the server 240 build a connection via the speech access device, thereby implementing a communication between the terminal and a server.

Figure 3:
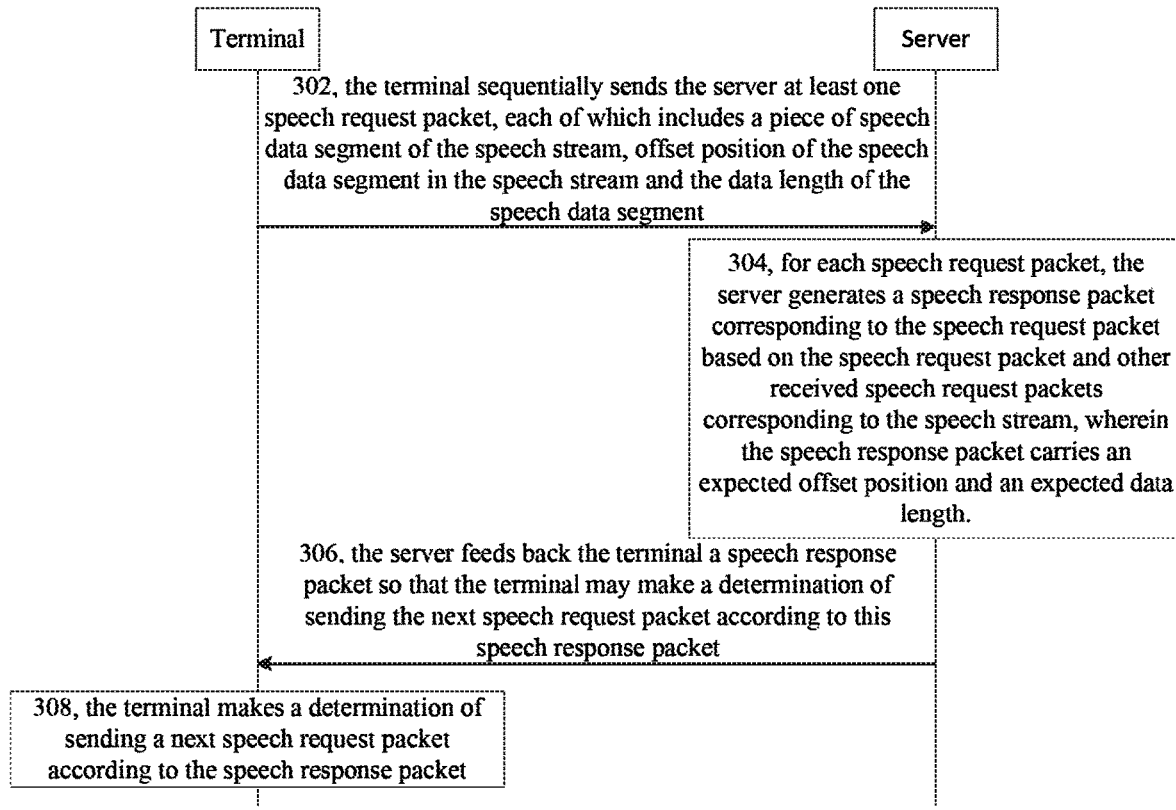
FIG. 3 is a flow chart of a speech transmission method according to various embodiments.

FIG. 3 illustrates a flow chart of a speech transmission method according to various embodiments of the present disclosure, and the speech transmission method may be used in the implementation environment shown in FIG. 2. The speech transmission method may comprise the following.

Block 302: The terminal sequentially sends the server at least one speech request packet, each of which includes a piece of speech data segment of the speech stream, offset position of the speech data segment in the speech stream, and the data length of the speech data segment. Correspondingly, the server sequentially receives, from the terminal, the at least one speech request packet, wherein each speech request packet includes a piece of speech data segment of the speech stream, offset position of the speech data segment in the speech stream, and the data length of the speech data segment.

Block 304: For each speech request packet, the server generates a speech response packet corresponding to the speech request packet based on the speech request packet and other received speech request packets corresponding to the speech stream, wherein the speech response packet carries an expected offset position and an expected data length. The expected offset position is the expected offset position, in the speech stream, of a speech data segment in a next speech request packet that is received by the server. The expected data length is the expected length of the data of the speech data segment in the next speech request packet that is received by the server.

Block 306: The server feeds back to the terminal a speech response packet so that the terminal may make a determination for sending the next speech request packet according to this speech response packet. Correspondingly, the terminal receives the speech response packet that corresponds to the speech request packet and is fed back by the server, wherein the speech response packet is generated by the server based on the speech request packet and other received speech request packets corresponding to the speech stream, and the speech response packet carries the expected offset position and the expected data length. The expected offset position is the expected offset position, in the speech stream, of a speech data segment in a next speech request packet that is received by the server. The expected data length is the expected length of the data of the speech data segment in the next speech request packet that is received by the server.

Block 308: The terminal makes a determination for sending a next speech request packet according to the speech response packet.

The above blocks 302 and 308 may be implemented separately as a speech transmission method on the terminal side, and the blocks 304 and 306 may be implemented separately as a speech transmission method on the server side According to the speech transmission method according to various embodiments, for each speech request packet received from the terminal, the server generates a speech response packet corresponding to the speech request packet based on the speech request packet and other received speech request packets corresponding to the speech stream, wherein the speech response packet carries the expected offset position and the expected data length and the server feeds back the terminal a speech response packet so that the terminal may make a determination about the next speech request packet to be sent according to this speech response packet. According to the above, the processing results of the speech stream may be inaccurate or the speech stream cannot be processed during the speech transmission due to packet loss, duplication, and disorder. These issues are addressed here, and can be solved, and the accuracy and process ability or the speech stream can be improved.

According to various embodiments, when a speech transmission is performed between a terminal and a server, the parameters involved in the speech request packet sent by the terminal and the parameters involved in the speech response packet fed back by the server are described below.

The parameters involved in the speech request packet are shown in the following Table 1:

TABLE 1

| Offset | Len | Is_end |
|---|---|---|
| | Speech stream data | |

Wherein, Speech stream data refers to speech data segment, Offset refers to the offset position to represent the offset position of the speech data segment in the entire speech stream, Len refers to data length to represent the length of the data of the speech data segment, and Is_end refers to the request end identifier to indicate whether the speech data segment carried in the current speech request packet is the last segment of the speech stream. For example, Is_end=1 represents True, i.e. the speech data segment carried in the current speech request packet is the last segment of the speech stream, while Is_end=0 represents False.

The parameters involved in the speech response packet are shown in the following Table 2:

TABLE 2

| Act_offset | Ack_len | Ret |
|---|---|---|
| | Recognition results | |

Wherein, Ret refers to a processing result identifier, indicating whether the speech request packet processing is successful or not, for example, when the speech request packet processing is successful, 0 may be returned, otherwise an error code may be returned, Act_offset refers to an expected offset position to represent an expected offset position, in the entire speech stream, of a speech data segment of a next speech request packet that is received by the server, Ack_len refers to an expected length of the data to represent an expected length of the data of a speech data segment in the entire speech stream of a next speech request packet that is received by the server, and Recognition results refers to the processing results of the speech stream, for example, results=XXX.

Figure 4:
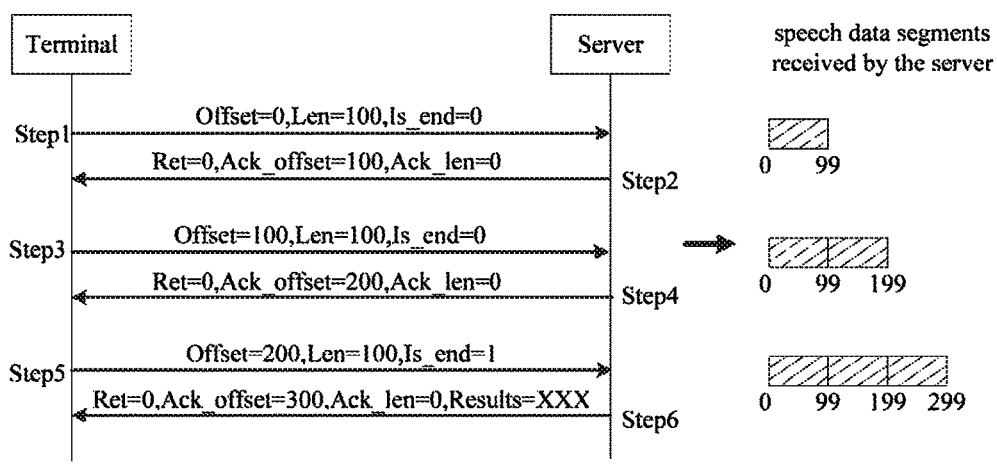
FIG. 4 is a flow chart of a speech transmission under normal conditions.

Before the detailed introduction and description are given for the packet loss, duplication, and disorder which occur when a speech transmission is performed according to the speech transmission method provided in various embodiments of the present disclosure, this application first gives an introduction of the process flow of the speech transmission under normal conditions, i.e. under the conditions that the packet loss, duplication, and disorder do not occur. FIG. 4 shows a flow chart of the speech transmission under normal conditions. Assume that the terminal divides the entire speech stream into three speech data segments, namely, the terminal sends the server three speech request packets in Step1, Step3, and Step5. respectively and sequentially, and correspondingly, the server feeds back three speech response packets, respectively, corresponding to the three speech request packets in Step2, Step4 and the Step6, respectively.

The first speech request packet sent by the terminal in Step1 carries the first speech data fragment Speech stream data1 (not shown in FIG. 4), an offset position Offset=0, data length Len=100, and the request end identifier Is_end=0. Since the speech data segment carried in the first speech request packet is located at the beginning of the entire speech stream, the Offset=0; Len=100 represents that the data length of the speech data segment carried in the first speech request packet is 100 and Is_end=0 denotes that the speech data segment carried in the first speech request packet is not the last segment. As shown in FIG. 4 on the right side, the first speech data segment in the first speech request packet received by the server includes the speech data segment having offset position from 0 to 99.

The second speech request packet sent by the terminal in Step3 carries a second speech data segment Speech stream data2 (not shown), an offset position Offset=100, data length Len=100, and the request end identifier Is_end=0. Since the speech data segment carried in the second speech request packet follows the speech data segment carried in the first speech request packet in the speech sequence, and the speech data segment carried in the first speech request packet has the offset position from 0 to 99, in the second speech request packet Offset=100; Len=100 denotes that the data length of the speech data segment carried in the second speech request packet is still 100; and Is_end=0 denotes that the speech data segment carried in the second speech request packet is not the last segment. As shown in FIG. 4 on the right side, the second speech data segment carried in the second speech request packet received by the server includes the speech data segment having offset position from 100 to 199, and when combined with the first speech data segment, for a total of the speech data segments with the offset position from 0 to 199.

Similarly, in the third speech request packet sent by the terminal in Step5, Offset=200 and Len=100 denotes that the data length of the speech data segment carried in the third speech request packet is still 100. Different from the previous two speech request packets, the request end identifier Is_end=1, indicating that the speech data segment carried in the third speech request packet is the last segment. As shown in FIG. 4 on the right side, the third speech data segment in the third speech request packet received by the server includes the speech data segment having offset position from 200 to 299, and when combined with the first and second speech data segments, for a total of the speech data segments with the offset position from 0 to 299.

The first speech response packet fed back by the server in Step2 is in response to the first speech request packet. The first speech response packet contains the processing result identifier Ret=0, the expected offset position Act_offset=100, and the expected data length Ack_len=0. Since the speech data segment of the first speech request packet is located at the beginning of the entire speech stream, and Offset=0, Len=100, that is, the first speech data segment includes the data arranged with the offset position from 0 to 99, the first speech response packet has an expected offset position Act_offset=100, which indicates that the server expects that offset position of the speech data segment in the next speech request packet in the speech stream is 100. Further, under normal conditions, the expected data length Ack_len is preset to be 0.

The second speech response packet fed back by the server in Step4 is in response to the second speech request packet. The second speech response packet contains the processing result identifier Ret=0, the expected offset position Act_offset=200, and the expected data length Ack_len=0. Since in the second speech request packet, Offset=100 and Len=100, namely, the second speech data segment includes the data arranged with the offset position from 100 to 199, the second speech response packet has an expected offset position Act_offset=200, which indicates that the server expects that offset position of the speech data segment in the next speech request packet in the speech stream is 200.

The third speech response packet fed back by the server in Step6 is in response to the third speech request packet. The third speech response packet contains the processing result identifier Ret=0, the expected offset position Act_offset=300, the expected data length Ack_len=0, and the processing result of the speech stream Results=XXX. Since in the third speech request packet, Offset=200 and Len=100, the third speech data segment includes the speech data arranged with the offset position from 200 to 299. So, the third speech response packet has an expected offset position Act_offset=300, which indicates that the server expects that offset position of the speech data segment in the next speech request packet in the speech stream is 300. Furthermore, since the third speech request packet carries the request end identifier Is_end=1, it indicates that the speech data segment carried in the third speech request packet is the last segment, and the third speech request packet needs to carry the processing result of the speech stream Results=XXX.

Hereinafter, from the server side and the terminal side, respectively, the speech transmission method provided in the various embodiments will be described in detail.

Figure 5A:
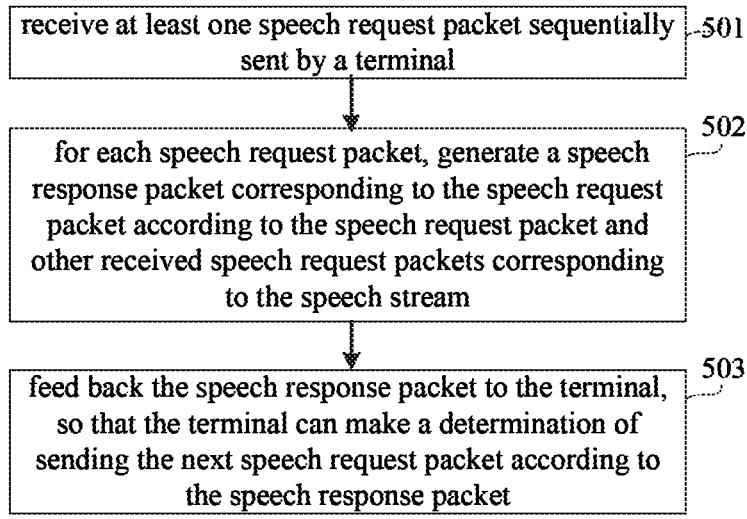
FIG. 5A is a flow chart of a speech transmission method according to various embodiments.

FIG. 5A illustrates a flow chart of a speech transmission method according to various embodiments of the present disclosure, wherein the speech transmission method may be applied to the server-side environment in the embodiment shown in FIG. 2. The speech transmission method may comprise the following processes.

Block 501: Receive at least one speech request packet sequentially sent by a terminal. For each speech stream, the terminal will divide the speech stream into several speech data segments and sequentially carry these speech data segments in different speech request packets to be sent. Correspondingly, the server receives the at least one speech request packet sequentially sent by the terminal. As shown in FIG. 4, each speech request packet carries one speech data segment of the speech stream, the offset position of the speech data segment in the speech stream, and the data length of the speech data segment.

Further, each speech request packet can also carries the request end identifier. For example, request end identifier Is_end=1 represents that the speech data segment carried in the speech request packet is the last segment of the speech stream and Is_end=0 represents that the speech data segment carried in the speech request packet is not the last segment of the speech stream. The speech request packet may not carry the request end identifier, for example, only the speech request packet which carries the last speech data segment of the speech stream contains a predetermined identification for labeling.

Since the issue of packet disorder, loss, and duplication may occur during the transmission of each speech request packet due to the network conditions, after each speech request packet is received and processed, the server generates a corresponding speech response packet sent to the terminal as guidance for the sending of the next speech request packet. The details are described in the following Block 502 and its various sub-processes.

Block 502: For each speech request packet, generate a speech response packet corresponding to the speech request packet according to the speech request packet and other received speech request packets corresponding to the speech stream. For each speech request packet, the server generates a speech response packet corresponding to the speech request packet according to the speech request packet and other received speech request packets corresponding to the speech stream. As shown in FIG. 4, the speech response packet carries the expected offset position and the expected data length, wherein the expected offset position is the expected offset position, in the speech stream, of a speech data segment in a next speech request packet that is received by the server and the expected data length is the expected length of the data of the speech data segment in the next speech request packet that is received by the server.

Further, each speech request packet may also carry a processing result identifier, which indicates whether the speech request packet is processed successfully. For example, if the processing result identifier Ret=0, it indicates that the speech request packet is processed successfully. If Ret shows error codes, it indicates that the processing of the speech request packet has failed due to discrepancies such as the internet failures or logic errors.

Figure 5B:
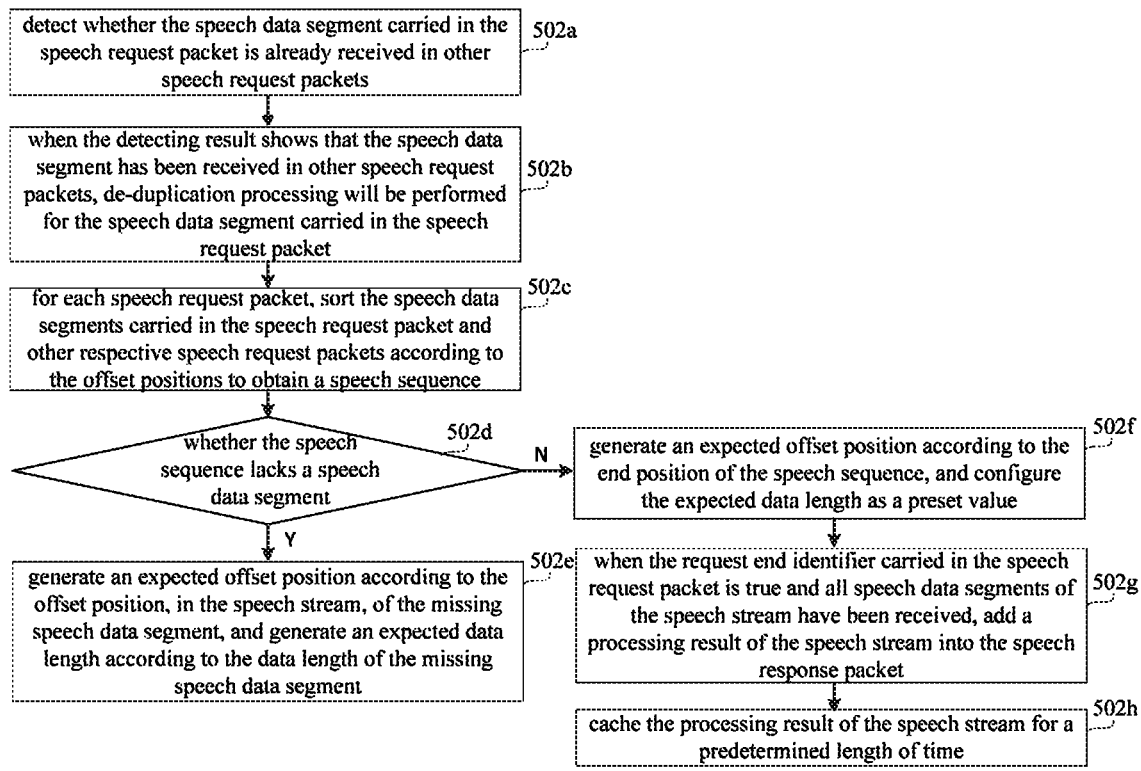
FIG. 5B is a flow chart of sub-processes of block 502 in the speech transmission method according to various embodiments.

As shown in FIG. 5B, block 502 may include the following sub-processes.

Block 502a: Detect whether the speech data segment carried in the speech request packet is already received in other speech request packets. In order to handle duplicate speech request packets, when each speech request packet is received, the server detects whether the speech data segment carried in the speech request packet is already received in other speech request packets. The server may detect whether the speech data segment carried in the speech request packet is already received in other speech request packets according to the offset position and the data length of the speech data segment. For example, during the processing of a speech stream, when the offset positions and the data lengths carried in two received speech request packets are the same, it may determine that the speech data segments carried in the two speech request packets are the same.

Due to the different data length of different speech data segments, the speech data segments carried in two speech request packets may be partially overlapped, or the speech data segment of one speech request packet contains the speech data segment of the other one speech request packet. However, for any one of the above data segment duplication conditions, the server can find the duplication according to the offset position and the data length of the speech data segments.

Block 502b: When the detecting result shows that the speech data segment has been received in other speech request packets, de-duplication processing will be performed for the speech data segment carried in the speech request packet. When the detecting result shows that the speech data segment has been received in other speech request packet, de-duplication processing will be performed by the server for the speech data segment carried in the speech request packet. The server selects the duplicate speech data segments, and only one copy of the duplicate speech data segments is maintained. De-duplication processing is performed once, not repeatedly, for the speech data segments. In consideration of possible packet loss during the transmission of the speech response packet, the terminal will sends a speech request packet again when it did not receive a speech response packet corresponding to the speech request packet. Therefore, the server still sends a speech response packet corresponding to the speech request packet carrying a duplicate speech data segment.

Figure 5C:
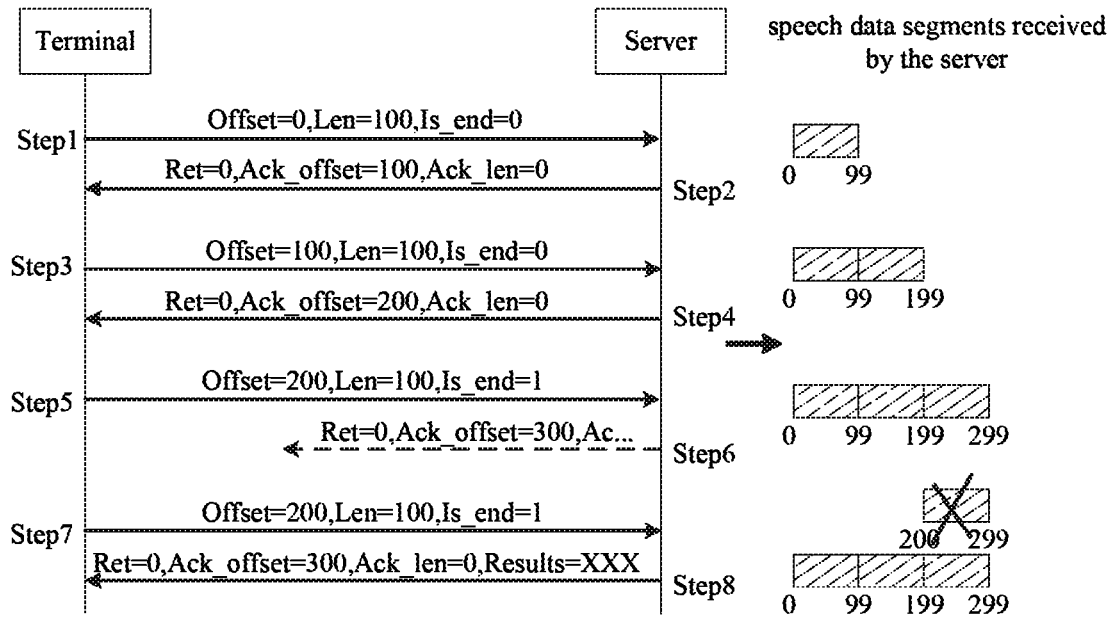
FIG. 5C is a flow chart showing the speech transmission when a speech request packet duplication occurs.

In FIG. 5C, the speech response packet fed back by the server in Step6 is lost during the transmission. The terminal has not received a speech response packet for a period of time, and the terminal then resends the speech request packet, identical to what has been sent in Step5, to the server in Step7. After receiving the speech request packet resent by terminal, the server resends a speech response packet, which is identical to what has been sent in Step6 to the terminal in Step8.

Block 502c: For each speech request packet, sort the speech data segments carried in the speech request packet and other respective speech request packets according to the offset positions to obtain a speech sequence. The offset position carried in each speech request packet represents the offset position, in the entire speech stream, of the speech data segment in the speech request packet. The server sorts the speech data segments carried in the speech request packet and other respective speech request packets according to the offset positions to obtain a speech sequence.

Referring to FIG. 4, after receiving the second speech request packet in Step3, the server determines the position orders of the speech data segments of the two speech request packets in the speech stream according to Offset=100 and Offset=0 in the first speech request packet sent in Step1 to obtain a speech sequence with the offset position from 0 to 199.

Figure 5D:
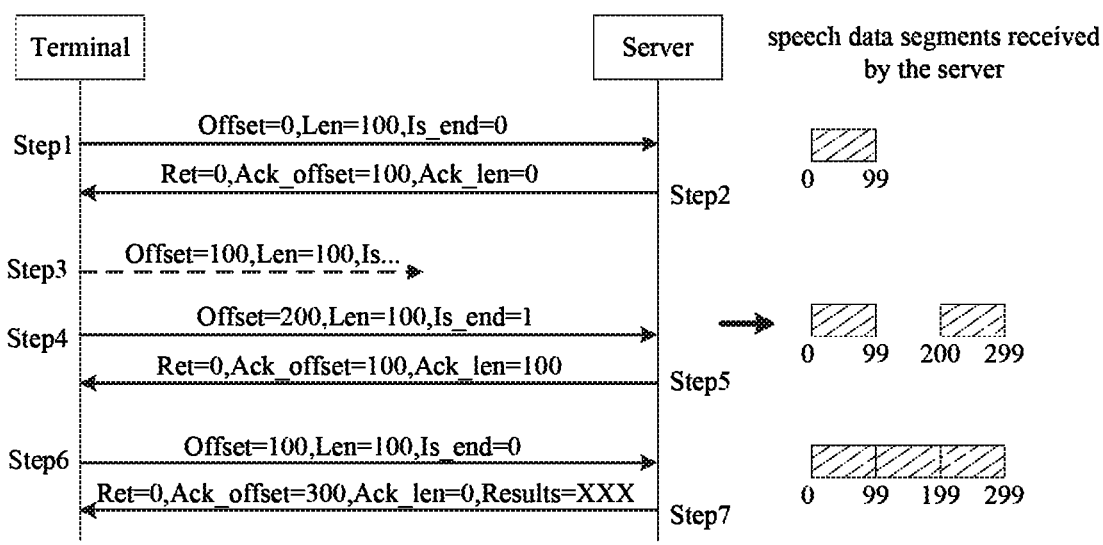
FIG. 5D is a flow chart showing the speech transmission when a speech request packet loss occurs.

In FIG. 5D, the speech request packet sent by the terminal in Step3 is lost during the transmission, and the terminal according to the sequence then still sends a next speech request packet in Step4. The server determines the position orders of the speech data segments of the two speech request packets in the speech stream according to Offset=200 in the speech request packet sent in Step4 and Offset=0 in the speech request packet sent in Step1, to obtain a speech sequence of which speech data segments have the offset positions from 0 to 199 and 200 to 299.

Block 502d: Determine whether the speech sequence lacks a speech data segment. When the speech sequence lacks a speech data segment, proceed to block 502e. When the speech sequence does not lack a speech data segment, proceed to block 502f.

The server determines whether the speech sequence lacks a speech data segment. The statement that the speech sequence lacks a speech data segment means that the speech sequence obtained by the server by the sorting action is not a complete sequence. For example, in the flow chart shown in FIG. 5D, after receiving the speech request packet in Step4, the server performs a sorting action to obtain a speech sequence of which the speech data segments have the offset positions from 0 to 99 and 200 to 299. That is, the obtained speech sequence lacks the speech data segment of which the offset position is from 100 to 199.

Figure 5E:
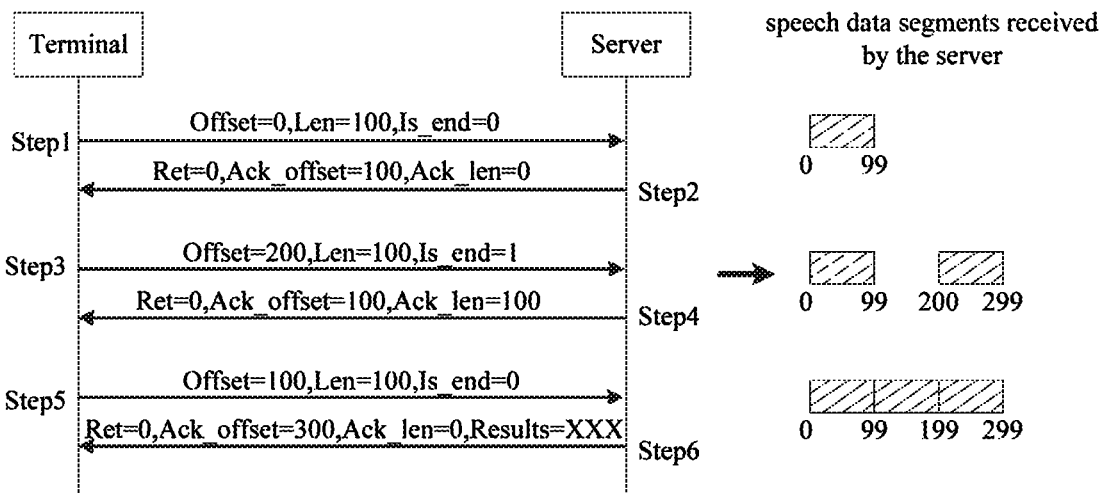
FIG. 5E is a flow chart showing the speech transmission when a speech request packet disorder occurs.

In another example, in FIG. 5E, during the transmission, a disorder occurs in the two speech request packets sent by the terminal in Step3 and Step5. The server determines the position orders of the speech data segments of the two speech request packets in the speech stream according to Offset=200 in the speech request packet sent in Step3 and Offset=0 in the speech request packet sent in Step1, to obtain a speech sequence of which speech data segments have the offset positions from 0 to 99 and 200 to 299. The obtained speech sequence also lacks the speech data segment of which the offset position is from 100 to 199.

Block 502e: Generate an expected offset position according to the offset position, in the speech stream, of the missing speech data segment, and generate an expected data length according to the data length of the missing speech data segment.

When it is determined that the speech sequence lacks a speech data segment, the server generates an expected offset position according to the offset position, in the speech stream, of the missing speech data segment, and generates an expected data length according to the data length of the missing speech data segment.

In the first possible implementation, when the speech sequence lacks one speech data segment, namely, one speech data segment is missing, for example, in the speech sequence obtained by the server by sorting the speech data segment carried in the speech request packets received in Step4, the missing speech data segment is the speech data segment of which the offset position is from 100 to 199. The server may then configure the expected offset position as 100 in order to be the same as the beginning offset position of the missing speech data segment, and configure the expected data length as 100 in order to be the same as the data length of the missing speech data segment. Thereafter, as shown in Step5 of FIG. 5D, the server may feed back a speech response packet which carries Act_offset=100 and Ack_len=100.

In the second possible implementation, when the speech sequence lacks two or more speech data segments, namely, two or more speech data segments are missing, the server generates an expected offset position according to the offset position, in the speech stream, of the first missing speech data segment in the speech sequence, and generates an expected data length according to the data length of the first missing speech data segment in the speech sequence.

Figure 5F:
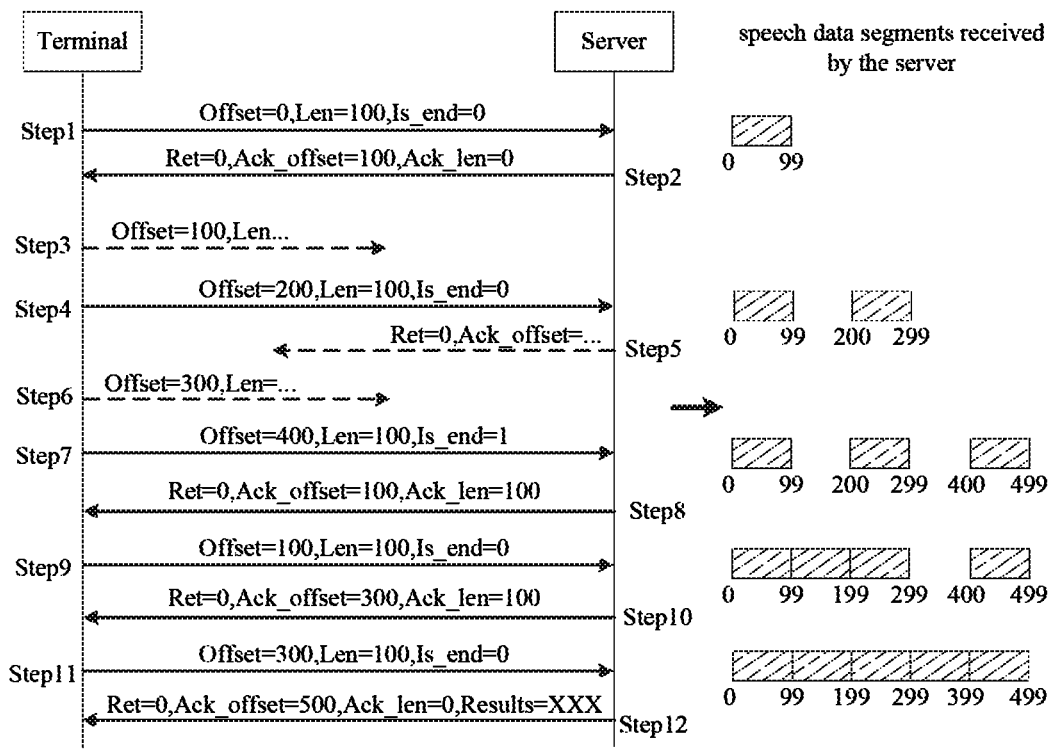
FIG. 5F is a flow chart showing the speech transmission when both a speech request packet loss and a speech response packet loss occur.

Referring to FIG. 5F, due to poor network environment, the speech request packets sequentially sent by the terminal in Step3 and Step6 are lost, and the speech response packet sent by the server in Step5 is also lost. After receiving the speech request packet sent by the terminal in Step6, the server performs a sorting action to obtain a speech sequence whose speech data segments have the offset positions from 0 to 99, 200 to 299 and 400 to 499. In such a case, two speech data segments are missing, i.e. the speech data segment whose offset position is from 100 to 199 and the speech data segment whose offset position is from 300 to 399. The server generates an expected offset position according to the offset position, in the speech stream, of the first missing speech data segment in the speech sequence, i.e. the expected offset position is 100. The server generates an expected data length according to the data length of the first missing speech data segment in the speech sequence, i.e. the expected data length is 100. Thereafter, as shown in Step8 of FIG. 5F, the server may feed back a speech response packet which carries Act_offset=100 and Ack_len=100.

Since during a speech transmission, especially when the speech transmission is between the mobile terminal or the like and a server, speech data contained in a speech stream is shorter. Thus, the number of speech data segments obtained by dividing the speech stream will not be large. Usually, it is sufficient to divide a speech stream into 10 speech request packets for transmission. Therefore, various embodiments use a relatively simple processing mechanism, that is, when two or more speech data segments are missing, the server computes only the offset position of the first missing speech data segment in the speech stream and its length data, and the following missing speech data segments are not in consideration. This can speed up the response speed of the server, as the server will also focus on making the calculation and processing of the speech data segments, thereby saving server overhead.

Block 502f: Generate an expected offset position according to the end position of the speech sequence and configure the expected data length as a preset value. When it is determined that the speech sequence does not lack a speech data segment, the server generates an expected offset position according to the end position of the speech sequence and configures the expected data length as a preset value.

Referring to FIG. 5D, after receiving the speech request packet sent by the terminal in Step6, the server performs a sorting action on the speech data segments to obtain a complete speech sequence of which the speech data segments have the offset position from 0 to 299. The server then generates an expected offset position according to the end position of the speech sequence and configures the expected data length as a preset value. When it is determined that the speech sequence does not lack a speech data segment, the server may generate the expected offset position according to the following two possible implementations.

In the first possible implementation, when it is determined that the speech sequence does not lack a speech data segment, the server always adds 1 to the end position of the speech sequence to generate the expected offset position. The server adds 1 to the end position of the speech sequence to generate the expected offset position, that is, the server expect to receive the speech data segments in order. As shown in Step7 of FIG. 5D, the server may feed back a speech response packet which carries Act_offset=300 and Ack_len=0.

In the second possible implementation, when it is determined that the speech sequence does not lack a speech data segment and all the received request end identifiers are False, the server adds 1 to the end position of the speech sequence to generate the expected offset position.

As described in the above block 501, each speech request packet may carry the request end identifier, and the request end identifier denotes whether the speech data segment carried in the speech request packet is the last segment of the speech stream. When all the received request end identifiers are False, i.e. all Is_end=0, that means that the last speech data segment of the speech stream has not been received, and the server then adds 1 to the end position of the speech sequence to generate the expected offset position. When the received request end identifier is True, i.e. Is_end=1, the server may use a preset identifier instead of the expected offset position, or may not generate the expected offset position, because at this moment, the server has received the complete speech stream and just needs to deal with the speech stream and feed back the processing result to the terminal.

Block 502g: When the request end identifier carried in the speech request packet is true and all speech data segments of the speech stream have been received, add a processing result of the speech stream into the speech response packet. When the request end identifier carried in the speech request packet are true and all speech data segments of the speech stream have been received, it means that the server has received the complete speech stream. In such a case, the server adds a processing result of the speech stream into the speech response packet. As shown in Step7 of FIG. 5D, the speech response packet fed back by the server contains the processing result of the speech stream Results=XXX.

Block 502h: Cache the processing result of the speech stream for a predetermined length of time. After generating the processing result of the speech stream, the server may cache the processing result of the speech stream for a predetermined length of time. The predetermined length of time can be pre-set according to actual requirements, such as 20 seconds. As such, when the speech response packet that is fed back from the server to the terminal and carries the processing result of the speech stream is lost, and the server has received a speech request packet that is resent by the terminal and carries the last segment, the server may retrieve the processing result of the speech stream directly from the cache and feed back the processing result to the terminal again. Otherwise, when the processing result of the speech stream is not cached, the server needs to retrieve the speech stream, and handle the speech stream again, which affects the efficiency of the server's response and increases the pressure on the server computing In summary, in the case of abnormal network conditions, speech request packet loss, duplication, and disorder may occur. Speech response packets generated by the server may have three main functions: First, when the speech sequence lacks a speech data segment due to the packet loss and packet disorder; the speech response packet should be used to indicate the terminal to resend the missing speech data segment. Second, when no speech data segment is missing due to the packet loss or packet disorder, the speech response packet should be used to indicate the terminal to send the next speech data segment as normal. Third, when the speech request packet carries the last segment of the speech stream, feed back the processing result of the speech stream in the speech response packet.

Block 503: Feed back the speech response packet to the terminal, so that the terminal can make a determination for sending the next speech request packet according to the speech response packet. The server feeds back the speech response packet to the terminal, so that the terminal can make a determination for sending the next speech request packet according to the speech response packet. Regardless of whether it is a speech response packet generated for the duplicated speech request packet, a speech response packet generated when a speech request packet loss or disorder occurs, or a speech response packet generated when a speech request packet loss or disorder does not occur, the server always feeds back the speech response packet to the terminal.

After receiving the speech response packet sent by the server, the terminal makes a determination for sending the next speech request packet according to the speech response packet. The terminal may determine whether the next speech request packet should be sent, determine the speech data segment carried by the next speech request packet, determine the offset position and the data length, etc. Terminal side processing mechanism will be described and illustrated in detail according to various embodiments shown in FIG. 6A below.

It should be noted that, in order to improve the concurrency of the server to make the number of the speech request packets processed by the server at the same time as large as possible, the server may not process the speech request packet immediately once it is received, but may cache the speech request packet for a while so that the response time is not affected, and may simultaneously process multiple speech request packets after a certain number of speech request packets have been received.

As mentioned above, according to the speech transmission method provided according to various embodiments, for each speech request packet received from the terminal, the server generates a speech response packet corresponding to the speech request packet based on the speech request packet and other received speech request packets corresponding to the speech stream, wherein the speech response packet carries the expected offset position and the expected data length, and the server feeds back the terminal a speech response packet so that the terminal may make a determination about the next speech request packet to be sent according to this speech response packet. According to the above methods, the issue of inaccurate processing results of the speech stream or the inability to process the speech stream during the speech transmission due to packet loss, duplication and disorder can be solved and avoided in the future.

Further, in the case where the packet loss and disorder occur in a plurality of speech request packets, after obtaining the speech sequence, regardless of the number of the missing speech data segments of the speech sequence, the server generates only the expected offset position of the first missing speech data segment in the speech stream and its expected length data. This can speed up the response speed of the server and the server will also focus on making the calculation and processing of the speech data segments, thereby saving server overhead.

Figure 6A:
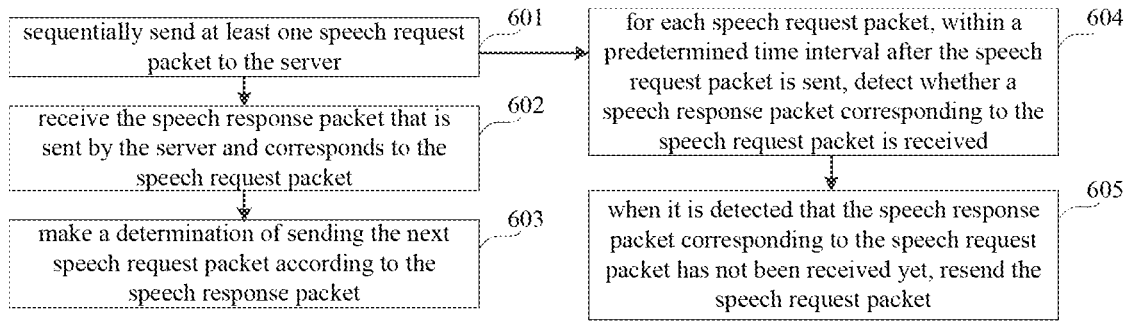
FIG. 6A is a flow chart of a speech transmission method according to various embodiments.

FIG. 6A illustrates a flow chart of a speech transmission method according to various embodiments of the present disclosure, wherein the speech transmission method may be applied to the terminal-side environment in the embodiment shown in FIG. 2. The speech transmission method may comprise the following processes.

Block 601: Sequentially send at least one speech request packet to the server. For one speech stream, the terminal may divide the speech stream into several speech data segments, and sequentially carries these speech data segments in different speech request packets for transmission. The terminal sequentially send the server at least one speech request packet. As shown in FIG. 4, each speech request packet carries one speech data segment of the speech stream, the expected offset position of the speech data segment in the speech stream, and the data length of the speech data segment.

Further, each speech request packet may carry the request end identifier. For example, when Is_end=1, this indicates that the speech data segment carried in the current speech request packet is the last segment of the speech stream, and when Is_end=0, this indicates that the speech data segment carried in the current speech request packet is not the last segment of the speech stream. The speech request packet may not carry the request end identifier, for example, only the speech request packet which carries the last speech data segment of the speech stream contains a predetermined identification for labeling.

Block 602: Receive the speech response packet that is sent by the server and corresponds to the speech request packet. The terminal receives the speech response packet that is sent by the server and corresponds to the speech request packet. The speech response packet is generated by the server according to the speech request packet and other received speech request packets corresponding to the speech stream. As shown in FIG. 4, the speech response packet carries the expected offset position and the expected data length, wherein the expected offset position is the expected offset position, in the speech stream, of a speech data segment in a next speech request packet that is received by the server; and the expected data length is the expected length of the data of the speech data segment in the next speech request packet that is received by the server.

In addition, each speech request packet may also carry a process result identifier, which indicates whether the speech request packet is processed successfully. For example, when the process result identifier Ret=0, this indicates that the speech request packet is processed successfully. When Ret shows error codes, this indicates that the processing of the speech request packet has failed due to discrepancies such as the internet failures or logic errors.

The detailed contents of how the server generates the speech response packet according to the speech request packets have been described and illustrated in various embodiments shown in FIG. 5A, and will not be described further herein.

Block 603: Make a determination for sending the next speech request packet according to the speech response packet. The process of making a determination for sending the next speech request packet may include the following. The terminal may determine whether the next speech request packet should be sent, determine the speech data segments carried by the next speech request packet, determine the expected offset position and the expected data length, etc.

Figure 6B:
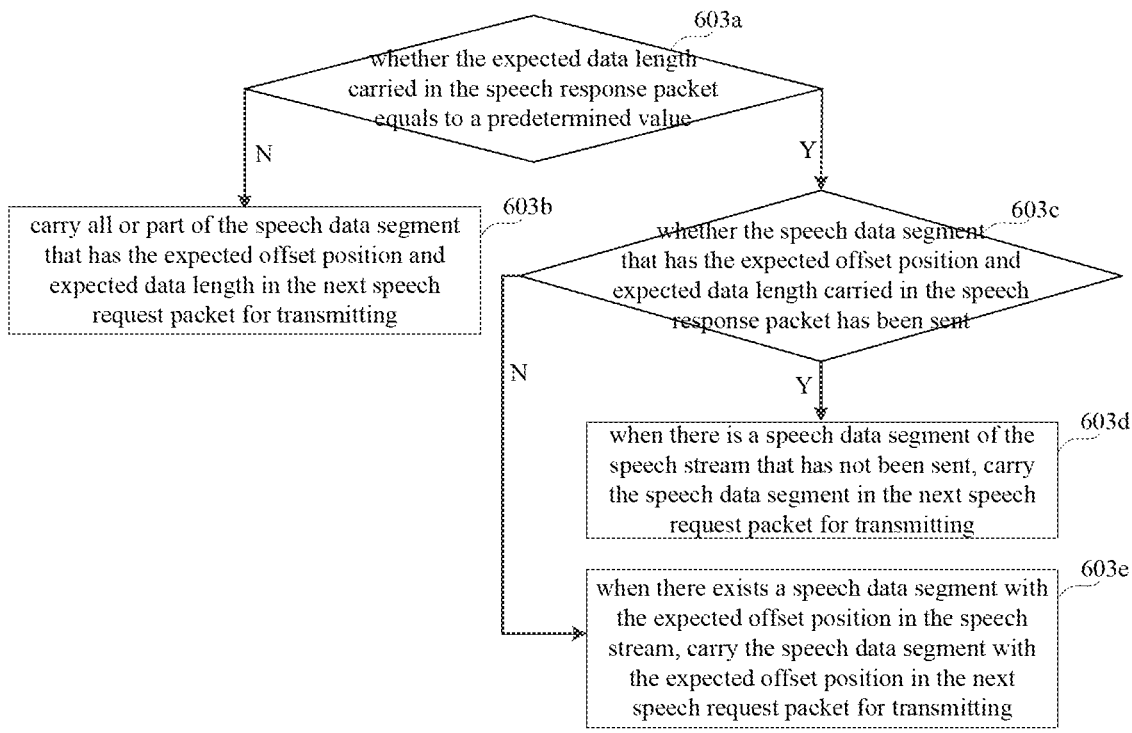
FIG. 6B is a flow chart of sub-processes of block 603 in a speech transmission method according to various embodiments.

Referring to FIG. 6B, the above process may include the following sub-processes.

Block 603a: Detect whether the expected data length carried in the speech response packet is equal to a predetermined value. When the expected data length carried in the speech response packet is not equal to the predetermined value, proceed to Block 603b. When the expected data length carried in the speech response packet is equal to a predetermined value, proceed to Block 603c.

The terminal determines whether the expected data length carried in the speech response packet is equal to a predetermined value. By deciding whether the expected data length carried in the speech response packet is equal to a predetermined value, the terminal may determine whether a packet loss or disorder occurs in the speech request packet sent by itself during the transmission. The expected data length represents the expected length of the data of the speech data segment in the next speech request packet that is received by the server. When the expected data length is equal to a predetermined value, i.e. when Ack_len=0, this indicates that the speech sequence obtained by the server does not lack a speech data segment, that is, the server does not find a packet loss or packet disorder. When the expected data length is not equal to a predetermined value, i.e. when Ack_len≠0, this indicates that the speech sequence obtained by the server lacks a speech data segment, that is, a packet loss or packet disorder occurs.

Block 603b: Carry all or part of the speech data segment that has the expected offset position and expected data length in the next speech request packet for transmitting. When the expected data length does not equal a predetermined value, the server carries all or part of the speech data segment that has the expected offset position and expected data length in the next speech request packet for transmitting. The expected offset position and expected data length represent the missing speech data segment needed by the server, and the terminal may send the missing speech data segment by carrying it in one speech request packet or in multiple speech request packets.

Referring to FIG. 5D, since the speech request packet sent by the terminal in Step3 is lost, the speech response packet fed back by the server in Step5 carries Ack_offset=100 and Ack_len=100, which indicates that the server needs the speech data segment whose offset position is from 100 to 199. After receiving the speech response packet fed back by the server in Step5, in Step6, the terminal carries the speech data segment whose offset position is from 100 to 199 in one speech request packet for transmitting.

The terminal may also send the speech data segment in multiple speech request packets, such as one speech request packet carries one part of the speech data segment with Offset=100 and Len=50, and another speech request packet carries the other part of the speech data segment with Offset=150 and Len=50.

Block 603c: Determine whether the speech data segment that has the expected offset position and expected data length carried in the speech response packet has been sent. When it determines that the expected data length is equal to the predetermined value, the terminal determines that the speech data segment that has the expected offset position and expected data length carried in the speech response packet has been sent. When it determines that the speech data segment that has the expected offset position and expected data length carried in the speech response packet has been sent, proceed to Block 603d. When it determines that the speech data segment that has the expected offset position and expected data length carried in the speech response packet has not been sent, proceed to Block 603e.

Block 603d: When there is another speech data segment of the speech stream that has not been sent, carry the speech data segment in the next speech request packet for transmitting.

Figure 6C:
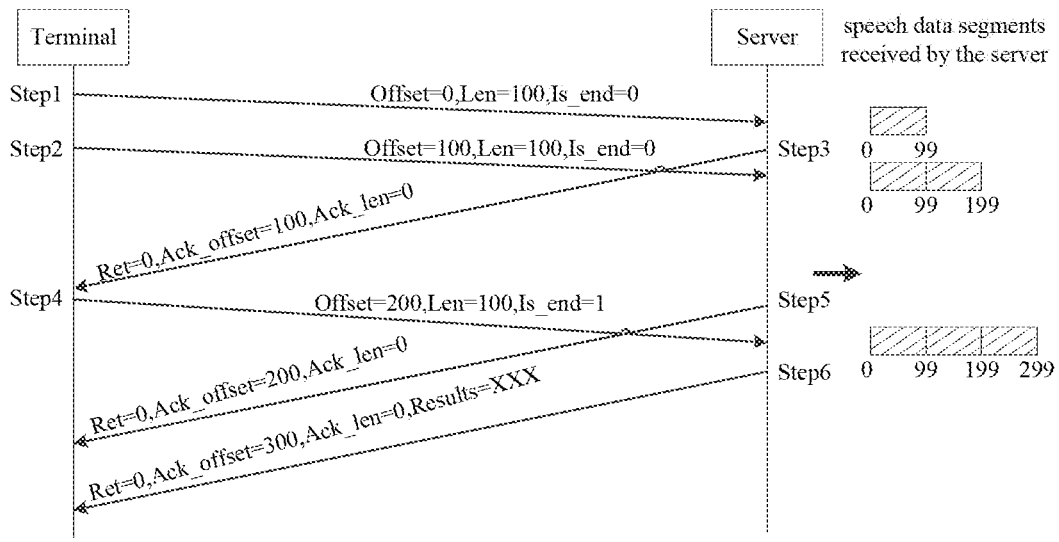
FIG. 6C is a flow chart of a relative speech transmission according to various embodiments.

Referring to FIG. 6C, the terminal has already sent the speech request packet that carries the speech data segment with Offset=100 to the server in Step2 when the terminal receives the speech response packet that fed back by the server in Step3 and corresponds to the speech request packet sent in Step1. At this moment, the terminal detects that the speech data segment with Offset=200 and Len=100 of the speech stream has not been sent, and the terminal then carries the speech data segment with Offset=200 and Len=100 in the speech request packet to be sent in Step4.

After receiving the speech response packet that was fed back by the server in Step5 and corresponds to the speech request packet sent in Step 2, the terminal reads the expected offset position Ack_offset=200 in the speech response packet and finds that the speech request packet carries the speech data segment with offset position Ack_offset=200 has been sent, and therefore all of the speech stream has been sent. The terminal does not then send a speech request packet any more, and waits for a processing result of the speech stream to be sent by the server.

Block 603e: When a speech data segment exists with the expected offset position in the speech stream, carry the speech data segment with the expected offset position in the next speech request packet for transmitting.

Referring to FIG. 4, after receiving the speech response packet that fed back by the server in Step2 and corresponds to the speech request packet sent in Step1, the terminal reads the expected offset position Ack_offset=100 in the speech response packet and finds that the speech request packet carries the speech data segment with offset position Ack_offset=100 has not been sent, and the speech data segment with the expected offset position Ack_offset=100 exists in the speech stream, the terminal then carries the speech data segment with Ack_offset=100 in the speech request packet to be sent in Step3.

Further, after block 601, the following may be performed.

Block 604: For each speech request packet, within a predetermined time interval after the speech request packet is sent, detect whether a speech response packet corresponding to the speech request packet is received. In consideration of the possible condition that a packet loss and disorder may occur in the speech response packet fed back by the server during the transmission, within a predetermined time interval after the speech request packet is sent, the terminal detects whether a speech response packet corresponding to the received speech request packet is received.

In one possible implementation, the terminal detects whether a speech response packet corresponding to the received speech request packet is received according to the expected offset position carried in the speech response packet. In the condition that packet loss and disorder do not occur, for each speech request packet, the expected offset position carried in the speech response packet fed back by the server equals to the value obtained by adding 1 to the end position of the speech data segment carried in the speech request packet. Therefore, the terminal is able to detect whether a speech response packet corresponding to the received speech request packet is received according to the expected offset position carried in the received speech response packet.

In this implementation there will be a deviation in the case that speech request packet loss or disorder occurs, because when a packet loss or disorder occurs, the expected offset position sent back by the server will be equal to the offset position of the missing speech data segment, and at this point the expected offset position sent back by the server does not accurately reflect the corresponding relationship between the speech response packet and the speech request packet, and some speech request packets may be unnecessarily resent by the terminal. However, because the server side needs only to do de-duplication processing, it will not bring great computing pressure on the server. The present implementation may enable easier speech transmission.

In another possible implementation, when sending the speech request packets, the terminal can add different identifiers to different speech request packets, e.g. adding identifier A to the first speech request packet and adding identifier B to the second speech request packet. After the server processes the first speech request packet, the first speech response packet fed back by the server also carries the identifier A. After the server processes the second speech request packet, the second speech response packet fed back by the server also carries the identifier B. As such, the terminal can determine the corresponding relationship between the speech response packet and the speech request packet according to the identifier in the received speech response packet, in order to detect whether the speech response packet corresponding to the speech request packet has been received within a predetermined time interval. Although the present implementation can determine the corresponding relationship between the speech request packet and the speech response packet, but will increase the computing amount of the server.

In practice, any one of the above two implementations can be selected based on the computing capability of the server.

Block 605: When it is detected that the speech response packet corresponding to the speech request packet has not been received yet, resend the speech request packet. When the speech response packet corresponding to the speech request packet has not been received yet within a predetermined time interval, it means that the speech response packet may be lost during the transmission. The terminal then resends the speech request packet, notifies the server that the speech response packet is lost, and requests the server to reprocess the speech request packet.

Referring to FIG. 5C, because the speech response packet fed back by the server in Step6 is lost and the terminal does not receive the response within a predetermined time interval, the terminal resends in Step7 the speech request packet that has been sent in Step5. Correspondingly, after receiving the resent speech request packet, the server retrieves the processing results of the speech stream Results=XXX from the cache, and resends a speech response packet that carries Results=XXX.

Further, the terminal may carry a request end identifier in each speech request packet, and the request end identifier indicates whether the speech data segment carried in the speech request packet is the last segment of the speech stream. For example, when Is_end=1, this indicates that the speech data segment carried in the current speech request packet is the last segment of the speech stream, and when Is_end=0, this indicates that the speech data segment carried in the current speech request packet is not the last segment of the speech stream. The speech request packet may not carry the request end identifier, for example, only the speech request packet which carries the last speech data segment of the speech stream contains a predetermined identification for labeling.

As mentioned above, according to the speech transmission method according to various embodiments, the terminal sends the server a speech request packet carrying the speech data segment, the offset position of the speech request packet in the speech stream, and the data length of the speech data segment, and after the terminal receives the speech response packet that is fed back by the server and carries the expected offset position and the expected data length, the terminal makes a determination about the next speech request packet to be sent according to this speech response packet. According to the above methods, the issue of inaccurate processing results of the speech stream or the inability to process the speech stream during the speech transmission due to packet loss, duplication and disorder can be solved and avoided in the future.

Further, various embodiments provide an improved speech transmission mechanism, wherein within a predetermined time interval after the terminal sends a speech request packet, the terminal detects whether the speech response packet corresponding to the speech request packet has been received, and resends the speech request packet when it detects that the speech response packet corresponding to the speech request packet has not been received, thereby avoiding the influence due to the occurrence of the speech response packet loss.

The following is the apparatus embodiment of the present disclosure, which can be used to perform the method embodiment of the present disclosure. For details that are not described in the apparatus embodiment of the present disclosure, please refer to the method embodiment of the present disclosure.

Figure 7:
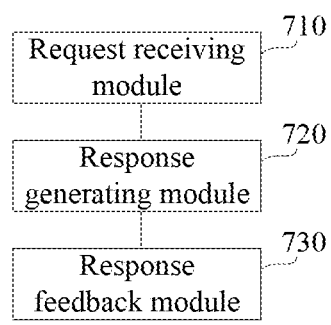
FIG. 7 is a block diagram showing the structure of a speech transmission apparatus according to various embodiments.

FIG. 7 illustrates a block diagram of the structure of a speech transmission apparatus provided according to various embodiments of the present disclosure. The speech transmission apparatus can be implemented as a part of or the entire server by using software, hardware, or a combination thereof. The speech transmission apparatus may comprise a request receiving module 710, a response generating module 720, and a response feedback module 730.

The request receiving module 710 receives at least one speech request packet sequentially sent by a terminal. Each speech request packet carries one speech data segment of the speech stream, the offset position of the speech data segment in the speech stream, and the data length of the speech data segment.

The response generating module 720, for each speech request packet, generates a speech response packet corresponding to the speech request packet according to the speech request packet and other received speech request packets corresponding to the speech stream. The speech response packet carries the expected offset position and the expected data length, wherein the expected offset position is the expected offset position, in the speech stream, of a speech data segment in a next speech request packet that is received by the server. The expected data length is the expected length of the data of the speech data segment in the next speech request packet that is received by the server.

The response feedback module 730 feeds back the speech response packet to the terminal, so that the terminal can make a determination for sending the next speech request packet according to the speech response packet.

As mentioned above, according to the speech transmission apparatus according to various embodiments, for each speech request packet received from the terminal, the server generates a speech response packet corresponding to the speech request packet based on the speech request packet and other received speech request packets corresponding to the speech stream, wherein the speech response packet carries the expected offset position and the expected data length. The server feeds back to the terminal a speech response packet so that the terminal may make a determination about the next speech request packet to be sent according to this speech response packet. According to the, the issue of inaccurate processing results of the speech stream or inability of the speech stream to be processed during the speech transmission due to packet loss, duplication and disorder can be solved and avoided in the future.

Figure 8:
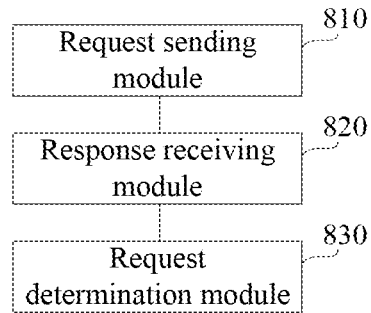
FIG. 8 is a block diagram showing the structure of a speech transmission apparatus according to various embodiments.

FIG. 8 illustrates a block diagram of the structure of a speech transmission apparatus provided according to various embodiments of the present disclosure. The speech transmission apparatus can be implemented as a part of or the entire terminal by using software, hardware, or a combination thereof. The speech transmission apparatus may comprise of a request sending module 810, a response receiving module 820, and a request determination module 830.

The request sending module 810 sequentially sends the server at least one speech request packet. Each speech request packet carries one speech data segment of the speech stream, the expected offset position of the speech data segment in the speech stream, and the data length of the speech data segment.

The response receiving module 820 receives the speech response packet that is sent by the server and corresponds to the speech request packet. The speech response packet is generated by the server according to the speech request packet and other received speech request packets corresponding to the speech stream. The speech response packet carries the expected offset position and the expected data length, wherein the expected offset position is the expected offset position, in the speech stream, of a speech data segment in a next speech request packet that is received by the server. The expected data length is the expected length of the data of the speech data segment in the next speech request packet that is received by the server.

The request determination module 830 makes a determination for sending the next speech request packet according to the speech response packet.

As mentioned above, according to the speech transmission apparatus provided according to various embodiments, the terminal sends the server a speech request packet carrying the speech data segment, the offset position of the speech request packet in the speech stream, and the data length of the speech data segment, and after the speech response packet that is fed back by the server receives and carries the expected offset position and the expected data length, the terminal makes a determination about the next speech request packet to be sent according to this speech response packet. According to the above methods, the issue of inaccurate processing results of the speech stream or the inability of the speech stream to be processed during the speech transmission due to packet loss, duplication, and disorder can be solved and avoided in the future.

Figure 9:
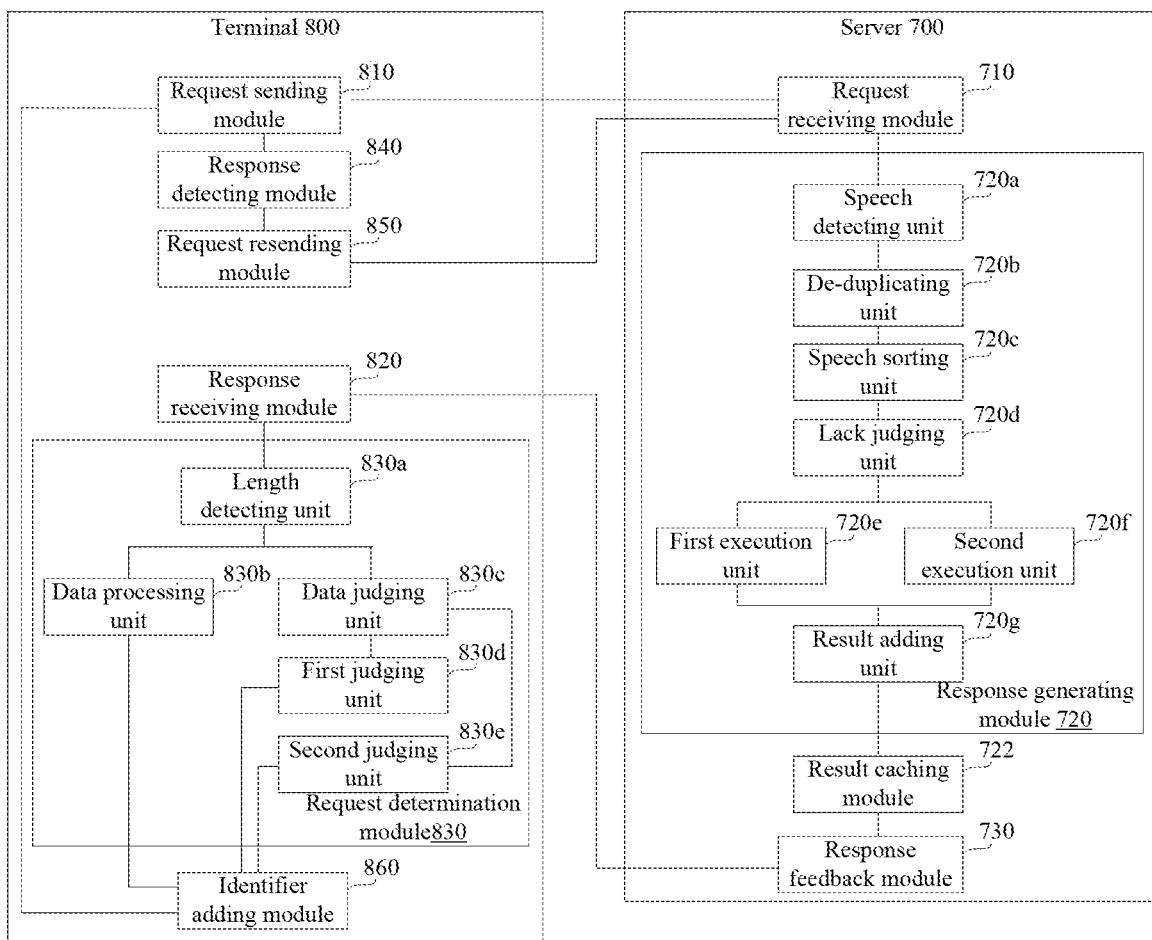
FIG. 9 is a block diagram showing the structure of a speech service system according to various embodiments.

FIG. 9 illustrates a block diagram of the structure of a speech service system provided according to various embodiments of the present disclosure. The speech service system may include a server 700 and a terminal 800.

The server 700 may include a speech transmission apparatus, which can be implemented by using software, hardware, or a combination thereof. The speech transmission apparatus may include a request receiving module 710, a response generating module 720, a result caching module 722, and a response feedback module 730.

The request receiving module 710 receives at least one speech request packet sequentially sent by a terminal. Each speech request packet carries one speech data segment of the speech stream, the offset position of the speech data segment in the speech stream, and the data length of the speech data segment.

The response generating module 720, for each speech request packet, generates a speech response packet corresponding to the speech request packet according to the speech request packet and other received speech request packets corresponding to the speech stream. The speech response packet carries the expected offset position and the expected data length, wherein the expected offset position is the expected offset position, in the speech stream, of a speech data segment in a next speech request packet that is received by the server. The expected data length is the expected length of the data of the speech data segment in the next speech request packet that is received by the server.

The response generating module 720 may include a speech detecting unit 720*a* and a de-duplicating unit 720*b*. The speech detecting unit 720*a* detects whether the speech data segment carried in the speech request packet is already received in other speech request packets. The de-duplicating unit 720*b* performs de-duplication processing for the speech data segment carried in the speech request packet when the speech detecting unit 720*a* detects that the speech data segment has been received in other speech request packets. The response generating module 720 may also include a speech sorting unit 720*c*, a lack judging unit 720*d*, a first execution unit 720*e*, and a second execution unit 720*f*. The speech sorting unit 720*c*, for each speech request packet, sorts the speech data segments carried in the speech request packet and other respective speech request packets according to the offset positions to obtain a speech sequence. The lack judging unit 720*d* determines whether the speech sequence lacks a speech data segment. The first execution unit 720*e* generates an expected offset position according to the offset position, in the speech stream, of the missing speech data segment, and generates an expected data length according to the data length of the missing speech data segment, when the lack judging unit 720*d* determines that the speech sequence lacks a speech data segment. The first execution unit 720e also generates an expected offset position according to the offset position, in the speech stream, of the first missing speech data segment in the speech sequence, and generates an expected data length according to the data length of the first missing speech data segment in the speech sequence, when the speech sequence lacks two or more speech data segments. The second execution unit 720f generates an expected offset position according to the end position of the speech sequence, and configures the expected data length as a preset value, when the lack judging unit 720d determines that the speech sequence does not lack a speech data segment.

In one possible implementation, each speech request packet may carry the request end identifier, and the request end identifier denotes whether the speech data segment carried in the speech request packet is the last segment of the speech stream.

The second execution unit 720f also adds 1 to the end position of the speech sequence to generate the expected offset position when all the received request end identifiers are False.

The response generating module 720 may also include a result adding unit 720g, which adds a processing result of the speech stream into the speech response packet when the request end identifier carried in the speech request packet is true and all speech data segments of the speech stream have been received. The result caching module 722 may be used to cache the processing result of the speech stream for a predetermined length of time. The response feedback module 730 may be used to feed back the speech response packet to the terminal, so that the terminal can make a determination for sending the next speech request packet according to the speech response packet.

The terminal 800 may include a speech transmission apparatus which can be implemented by using software, hardware, or a combination thereof. The speech transmission apparatus may comprise of a request sending module 810, a response receiving module 820, a request determination module 830, a response detecting module 840, a request resending module 850, and an identifier adding module 860.

The request sending module 810 sequentially sends the server at least one speech request packet. Each speech request packet carries one speech data segment of the speech stream, the expected offset position of the speech data segment in the speech stream, and the data length of the speech data segment.

The response receiving module 820 receives the speech response packet that is sent by the server and corresponds to the speech request packet. The speech response packet is generated by the server according to the speech request packet and other received speech request packets corresponding to the speech stream. The speech response packet carries the expected offset position and the expected data length, wherein the expected offset position is the expected offset position, in the speech stream, of a speech data segment in a next speech request packet that is received by the server. The expected data length is the expected length of the data of the speech data segment in the next speech request packet that is received by the server.

The request determination module 830 makes a determination for sending the next speech request packet according to the speech response packet. The request determination module 830 may include a length detecting unit 830a and a data processing unit 830b. The length detecting unit 830a may be used to detect whether the expected data length carried in the speech response packet is equal to a predetermined value. The data processing unit 830b may be used to carry all or part of the speech data segment that has the expected offset position and expected data length in the next speech request packet for transmitting, when the length detecting unit 830a detects that the expected data length carried in the speech response packet does not equal a predetermined value.

The request determination module 830 may also include a data determining unit 830c, a first determining unit 830d, and a second determining unit 830e. The data determining unit 830c may be used to determine whether the speech data segment that has the expected offset position and expected data length carried in the speech response packet has been sent when the length detecting unit 830a detects that the expected data length carried in the speech response packet equals to the predetermined value. The first judging unit 830d may be used to carry the speech data segment in the next speech request packet for transmitting, when the data determining unit 830c judges that the speech data segment that has the expected offset position and expected data length carried in the speech response packet has been sent, and there is still a speech data segment of the speech stream that has not been sent. The second determining unit 830e may be used to carry the speech data segment with the expected offset position in the next speech request packet for transmitting, when the data judging unit 830c determines that the speech data segment that has the expected offset position and expected data length carried in the speech response packet has not been sent yet and a speech data segment with the expected offset position exists in the speech stream.

The response detecting module 840 may be used to, for each speech request packet, detect whether a speech response packet corresponding to the received speech request packet is received within a predetermined time interval after the speech request packet is sent. The request resending module 850 may be used to resend the speech request packet when the response detecting module 840 detects that the speech response packet corresponding to the speech request packet has not been received yet. The identifier adding module 860 may be used to carry a request end identifier in each speech request packet, and the request end identifier indicates whether the speech data segment carried in the speech request packet is the last segment of the speech stream.

As mentioned above, according to the speech service system provided in the various embodiments, for each speech request packet received from the terminal, the server generates a speech response packet corresponding to the speech request packet based on the speech request packet and other received speech request packets corresponding to the speech stream, wherein the speech response packet carries the expected offset position and the expected data length; and the server feeds back the terminal a speech response packet so that the terminal may make a determination about the next speech request packet to be sent according to this speech response packet. According to the above methods, the issue of inaccurate processing results of the speech stream or the inability of the speech stream to be processed during the speech transmission due to packet loss, duplication, and disorder can be solved and avoided in the future.

Further, in the case that the packet loss and disorder occur in a plurality of speech request packets, after obtaining the speech sequence, regardless of the number of the missing speech data segments of the speech sequence, the server generates only the expected offset position of the first missing speech data segment in the speech stream and its expected length data. This can speed up the response speed of the server, and the server will also focus on making the calculation and processing of the speech data segments, thereby saving server overhead. Various embodiments provide an improved speech transmission mechanism, wherein within a predetermined time interval after the terminal sends a speech request packet, the terminal detects whether the speech response packet corresponding to the speech request packet has been received, and resends the speech request packet when it detects that the speech response packet corresponding to the speech request packet has not been received, thereby avoiding the influence due to the occurrence of the speech response packet loss.

In the speech transmission apparatus and speech service system described in the above embodiments, the functional modules illustrated are only examples for providing the speech service. In practical applications, the functions of the speech transmission apparatus and speech service system may be implemented by different functional modules to complete all or part of the functions described above. In addition, the speech transmission apparatus and method and the speech service system provided in the above-described embodiments have the same conception, and the various implementation process are described in detail in the method embodiments, thus, no further explanation is given.

Figure 10:
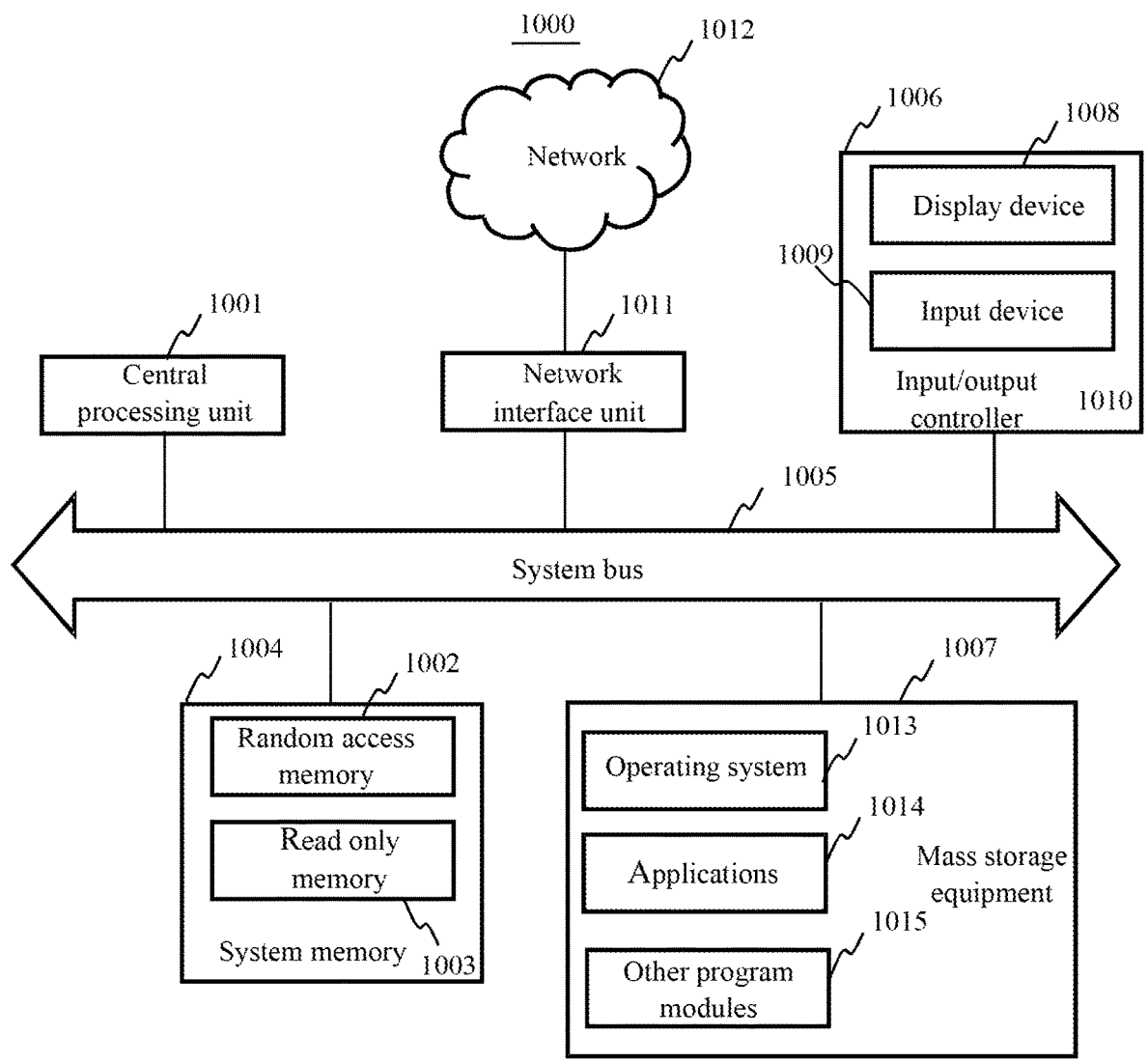
FIG. 10 is a block diagram showing the structure of a server according to various embodiments.

FIG. 10 shows a diagram of the structure of a server according to various embodiments of the present disclosure. The server can be used to implement the speech transmission method executed in the server side described in the various embodiments. The server 1000 includes a central processing unit (CPU) 1001, a system memory 1004 including a random access memory (RAM) 1002 and a read only memory (ROM) 1003, and a system bus 1005 connecting the system memory 1004 and the central processing unit 1001. The server 1000 also includes a basic input/output system (I/O system) 1006 to transfer information between various devices within the computer, and a mass storage equipment 1007 used for storing an operating system 1013, applications 1014 and other program modules 1015.

The basic input/output system 1006 includes a display device 1008 for displaying information and an input device 1009 for users to input information, such as a mouse, a keyboard, or the like. The display device 1008 and the input device 1009 are coupled to the central processing unit 1001 by being respectively connected to an input/output controller 1010 of the system bus 1005. The basic input/output system 1006 may also include an input/output controller 1010 for receiving and processing the input information from many other devices such as a keyboard, mouse, or electronic stylus. Similarly, the input/output controller 1010 may also output information to a display, a printer, or other type of output devices.

The mass storage device 1007 is coupled to the central processing unit 1001 by being connected to a mass storage controller (not shown) of the system bus 1005. The mass storage device 1007 and its associated computer-readable media provide non-volatile storage for the server 1000. That is, the mass storage device 1007 may include a computer readable medium (not shown), such as a hard disk or CD-ROM drive or the like.

The computer-readable media may include computer storage media and communication media. The computer storage media includes volatile and nonvolatile, removable and non-removable media realized by any method or technology which stores the information, such as computer readable instructions, data structures, program modules, or other data. The computer storage media includes RAM, ROM, EPROM, EEPROM, flash memory or other solid state memory and its technology, CD-ROM, DVD or other optical storage, magnetic cassettes, magnetic tape, and magnetic disk storage or other magnetic storage devices. It will be known to those skilled in the art that the computer storage medium is not limited to the above-descried medium. The above system memory 1004 and the mass storage device 1007 may be collectively referred to as memory.

According to various embodiments, the server 1000 can also be connected via a network, such as the Internet, to a remote computer on the network for running. That is, the server 1000 can be coupled to the network 1012 by being connected to the network interface unit 1011 of the system bus 1005, or coupled to other types of networks or a remote computer system (not shown) via the network interface unit 1011.

The memory may further comprise one or more programs, the one or more programs are stored in a memory, and are configured to be executed by one or more central processing units 1001. The one or more programs include the instructions for performing the following.

The instructions perform receiving at least one speech request packet sequentially sent by a terminal. Each speech request packet carries one speech data segment of the speech stream, the offset position of the speech data segment in the speech stream, and the data length of the speech data segment. For each speech request packet, generate a speech response packet corresponding to the speech request packet according to the speech request packet and other received speech request packets corresponding to the speech stream. The speech response packet carries the expected offset position and the expected data length, wherein the expected offset position is the expected offset position, in the speech stream, of a speech data segment in a next speech request packet that is received by the server; and the expected data length is the expected length of the data of the speech data segment in the next speech request packet that is received by the server. Feed back the speech response packet to the terminal, so that the terminal can make a determination for sending the next speech request packet according to the speech response packet.

Considering that the above implementation is a first possible implementation, it is possible to provide a second possible implementation on the basis of the first implementation, and in the second possible implementation, the memory of the server may further comprise instructions to perform the following operations: for each speech request packet, sort the speech data segments carried in the speech request packet and other respective speech request packets according to the offset positions to obtain a speech sequence, determine whether the speech sequence lacks a speech data segment, generate an expected offset position according to the offset position, in the speech stream, of the missing speech data segment, and generate an expected data length according to the data length of the missing speech data segment, when it is determined that the speech sequence lacks a speech data segment; generate an expected offset position according to the end position of the speech sequence, and configures the expected data length as a preset value, when it is determined that the speech sequence does not lack a speech data segment.

It is possible to provide a third possible implementation on the basis of the second implementation, and in the third possible implementation, the memory of the server may further comprise instructions to perform the following operations. Generate an expected offset position according to the offset position, in the speech stream, of the first missing speech data segment in the speech sequence, and generate an expected data length according to the data length of the first missing speech data segment in the speech sequence, when the speech sequence lacks two or more speech data segments.

It is possible to provide a fourth possible implementation on the basis of the second implementation, and in the fourth possible implementation, the memory of the server may further comprise of instructions to perform the following operations. Add 1 to the end position of the speech sequence to generate the expected offset position when all the received request end identifiers are False.

It is possible to provide a fifth possible implementation on the basis of the first implementation, and in the fifth possible implementation, the memory of the server may further comprise of instructions to perform the following operations. Detect whether the speech data segment carried in the speech request packet is already received in other speech request packets and, when it detects that the speech data segment carried in the speech request packet is already received, a deduplication process will be performed for the speech data segment carried in the speech request packet.

It is possible to provide a sixth possible implementation on the basis of any one of the first to fifth implementations, and in the sixth possible implementation, the memory of the server may further comprise instructions to perform the following operations.

The process, for each speech request packet generating a speech response packet corresponding to the speech request packet according to the speech request packet and other received speech request packets corresponding to the speech stream may comprise of the following. Adding a processing result of the speech stream into the speech response packet when the request end identifier carried in the speech request packet is True and all speech data segments of the speech stream have been received.

It is possible to provide a seventh possible implementation on the basis of the sixth implementations, and in the seventh possible implementation, the memory of the server may further comprise of instructions to perform the operation to cache the processing result of the speech stream for a predetermined length of time.

As mentioned above, according to the server provided in the various embodiments, for each speech request packet received from the terminal, the server generates a speech response packet corresponding to the speech request packet based on the speech request packet and other received speech request packets corresponding to the speech stream, wherein the speech response packet carries the expected offset position and the expected data length, and the server feeds back the terminal a speech response packet so that the terminal may make a determination about the next speech request packet to be sent according to this speech response packet. According to the above methods, the issue of the inaccurate processing results of the speech stream or the inability of the speech stream to be processed during the speech transmission due to packet loss, duplication, and disorder can be solved and avoided in the future.

Further, in the case that packet loss and disorder occur in a plurality of speech request packets, after obtaining the speech sequence, regardless of the number of the missing speech data segments of the speech sequence, the server generates only the expected offset position of the first missing speech data segment in the speech stream and its expected length data. This can speed up the response speed of the server and the server will also focus on making the calculation and processing of the speech data segments, thereby saving server overhead.

Figure 11:
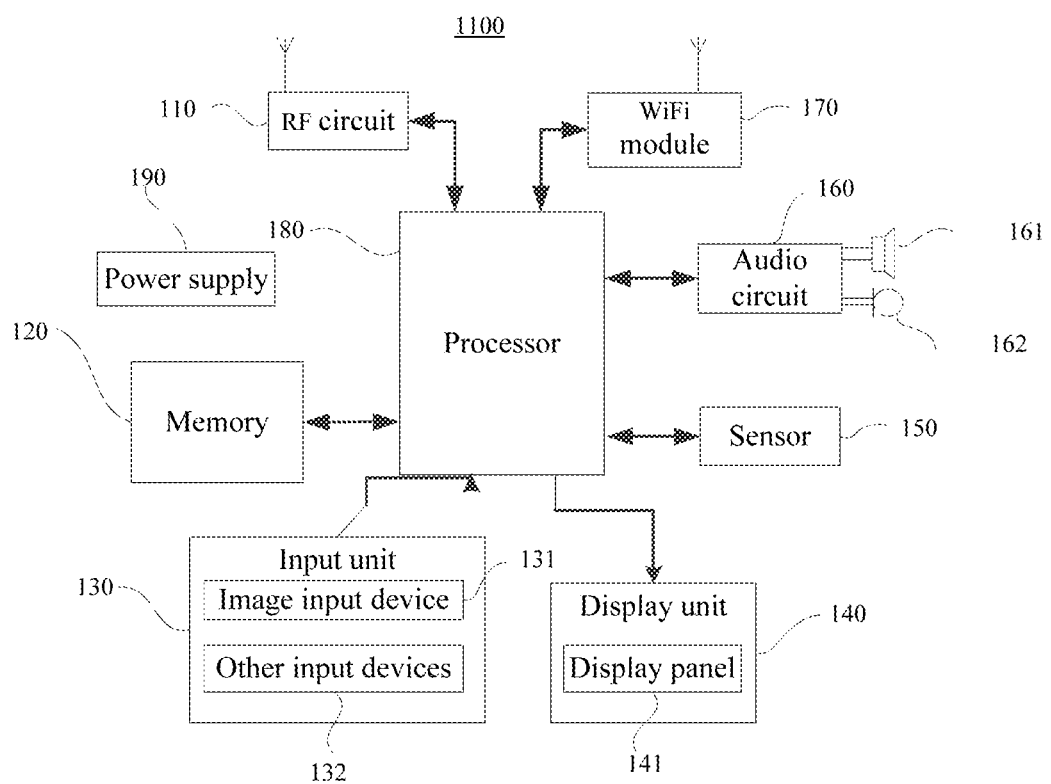
FIG. 11 is a block diagram showing the structure of a terminal according to various embodiments.

FIG. 11 shows a diagram of the structure of a terminal according to various embodiments of the present disclosure. The terminal can be used to implement the speech transmission method executed in the terminal side described in the above embodiments. The terminal 1100 may include a memory 120 including one or more computer-readable storage medium and a processor 180 including one or more processing cores. Among them, the memory 120 may be used to store software programs and modules, and the processor 180 performs a variety of functional applications for speech transmission and data processing by running the software programs and modules stored in the memory 120. The memory 120 may include a program storage area and a data storage area, wherein the program storage area may store an operating system program, an application (such as speech transmission program or the like) desired by at least one function, and the like. The data storage area may store the data created based on the usage of the terminal 1100. Further, the memory 120 may also include a high-speed random access memory and may also include a nonvolatile memory, such as at least one disk storage device, flash memory devices, or other volatile solid-state memory devices. Accordingly, the memory 120 may also include a memory controller for the processor 180 to access to the memory 120. The terminal may be a mobile phone, a server, a computer, or other equipment.

In some applications, the terminal 1100 may further include a communication unit 110, an input unit 130, a display unit 140, a sensor 150, an audio circuit 160, a Wi-Fi (wireless fidelity) module 170, and a power supply 190, etc. Those skilled in the art will understand that the structure of the terminal illustrated in FIG. 11 does not limit the terminal, and the terminal may include more or fewer components, a combination of certain components, or a different arrangement of components.

The communication unit 110 may send and receive messages or receive and transmit signals during a call. The communication unit 110 may be a network communication device, such as RF (Radio Frequency) circuit, a router, or a modem. Particularly, when the communication unit 110 is an RF circuit, after receiving the downlink message from the base station, the communication unit 110 sends the downlink message to one or more processors 180 for processing and further sends the uplink data to the base station. Typically, the RF circuit used as the communication unit includes, but is not limited to, a communication antenna, at least one amplifier, a tuner, one or more oscillators, a subscriber identity module (SIM) card, a transceiver, a coupler, LNA (Low Noise Amplifier), a duplexer, etc. In addition, the communication unit 110 may also communicate with the network and other devices by wireless communication. The wireless communication may use any communication standard or protocol including, but not limited to, GSM (Global System of Mobile communication), GPRS (General Packet Radio Service), CDMA (Code Division Multiple Access), WCDMA (wideband Code Division Multiple Access), LTE (long Term Evolution), e-mail, SMS (short messaging service), and so on.

The input unit 130 may receive entered numbers or character information and generates keyboard, mouse, joystick, optical, or trackball signal input related to the user settings and control functions. The input unit 130 may include an image input device 131 and other input devices 132. The image input device 131 may be a camera or a photoelectric scanning device. In addition to the image input device 131, the input unit 130 may also include other input devices 132. In particular, other input devices 132 may include, but are not limited to, one or more of physical keyboard, function keys (such as volume control buttons, switching keys, etc.), track balls, mouse, joystick, and the like.

The display unit 140 may be used to display information input by the user or information provided to the user and a variety of graphical user interfaces of the terminal 1100, wherein the graphical user interfaces may be formed of graphics, text, icons, video, and any combination thereof. The display unit 140 may include a display panel 141, which may be formed by using LCD (Liquid Crystal Display), OLED (Organic Light-Emitting Diode) and the like.

The sensor 150 may be a light sensor, a motion sensor, or other sensors. The optical sensor may include an ambient light sensor and proximity sensor, wherein the ambient light sensor may adjust the brightness of the display panel 141 according to the light and shade of the ambient light, and the proximity sensor may close the display panel 141/or backlight when the terminal 1100 moves to ears. As a motion sensor, a gravity sensor can detect the acceleration in all directions (usually triaxle), and can detect the magnitude and direction of gravity when it stands still and, thus can be used in applications (such as horizontal and vertical screen switch, the relevant Games, calibrated magnetometer attitude) for recognizing the phone posture, in functions (such as pedometer, percussion) related to vibration identification and the like. The terminal 1100 can also be configured with a gyroscope, a barometer, a hygrometer, a thermometer, an infrared sensor, and other sensors and the detailed description will not be given further herein.

The audio circuit 160, speaker 161, and microphone 162 may provide audio interfaces between the user and the terminal 1100. The audio circuit 160 may transmit the electric signals converted from the received audio data to the speaker 161 and the speaker 161 converts the electric signals to sound signals to output. Additionally, the microphone 162 converts the collected sound signals into electric signals, the audio circuit 160 receives the electric signals and converts them into audio data, and then outputs the audio data to the processor 180 for processing. The processed audio data may be transmitted to another terminal via the RF circuit 110 or may be output to the memory 120 for further processing. The audio circuit 160 may also include a headset jack to provide communications between peripherals headset and terminal 1100.

Wi-Fi is a kind of short-range wireless transmission technology, and the terminal 1100 can help users send and receive e-mail, browse the Web, and access streaming media, etc. through the Wi-Fi module 170. It provides users with wireless broadband Internet access. Although Figurel 1 shows the Wi-Fi module 170, it will be understood that it is not the necessary part of the terminal 1100, and may be omitted as necessary within the scope of the disclosure.

The processor 180 is a control center of the terminal 1100, uses a variety of interfaces and lines to connect the various parts of the entire mobile phone there between, performs various functions and data processing for the terminal 1100 by running or executing the software program and/or modules stored in the data memory 120 and invoking the data stored in the memory 120, and thus, monitors the overall mobile phone. Among them, the processor 180 may include one or more processing cores. In addition, the processor 180 may be integrated with application processors and modem processors, wherein the application processors process the operating system, user interfaces, and applications, and the modem processors process wireless communications. The above modem processors may not be integrated into the processor 180.

The power supply 190 (such as a battery) supplies the various components, and can be logically connected to the processor 180 through a power management system to manage the charging, discharging, and power consumption by the power management system. The power supply 190 may also include any one of the one or more DC or AC power supplies, a recharging system, a power failure detection circuit, a power converter or inverter, power status indicators, etc.

Although not shown, the terminal 1100 may also include a Bluetooth module, which will not be described further herein. In various embodiments, the terminal further includes a memory and one or more programs, wherein the one or more programs are stored in the memory and are configured to be performed by one or more processors. The one or more programs contain instructions for performing the following operations. Sequentially send the server at least one speech request packet, each speech request packet carries one speech data segment of the speech stream, the expected offset position of the speech data segment in the speech stream and the data length of the speech data segment. Receive the speech response packet that is sent by the server and corresponds to the speech request packet. The speech response packet is generated by the server according to the speech request packet and other received speech request packets corresponding to the speech stream. The speech response packet carries the expected offset position and the expected data length, wherein the expected offset position is the expected offset position, in the speech stream, of a speech data segment in a next speech request packet that is received by the server and the expected data length is the expected length of the data of the speech data segment in the next speech request packet that is received by the server and makes a determination for sending the next speech request packet according to the speech response packet.

Considering the above implementation is a first possible implementation, it is possible to provide a second possible implementation on the basis of the first implementation, and in the second possible implementation, the memory of the terminal may further comprise instructions to perform the following operations. Detect whether the expected data length carried in the speech response packet is equal to a predetermined value and carry all or part of the speech data segment that has the expected offset position and expected data length in the next speech request packet for transmitting, when it is detected that the expected data length carried in the speech response packet does not equal to a predetermined value.

It is possible to provide a third possible implementation on the basis of the second implementation, and in the third possible implementation, the memory of the terminal may further comprise instructions to perform the following operations. Determine whether the speech data segment that has the expected offset position and expected data length carried in the speech response packet has been sent, when it is detected that the expected data length carried in the speech response packet equals to the predetermined value. Carry the speech data segment in the next speech request packet for transmitting, when it is determined that the speech data segment that has the expected offset position and expected data length carried in the speech response packet has been sent, and there is still a speech data segment of the speech stream that has not been sent. Carry the speech data segment with the expected offset position in the next speech request packet for transmitting when it is determined that the speech data segment that has the expected offset position and expected data length carried in the speech response packet has not been sent yet and a speech data segment with the expected offset position exists in the speech stream.

It is possible to provide a fourth possible implementation on the basis of the first implementation, and in the fourth possible implementation, the memory of the terminal may further comprise instructions to perform the following operations. For each speech request packet, detect whether a speech response packet corresponding to the received speech request packet is received, within a predetermined time interval after the speech request packet is sent. Resend the speech request packet when it is detected that the speech response packet corresponding to the speech request packet has not yet been received.

It is possible to provide a fifth possible implementation on the basis of any one of the first to fourth implementations, and in the fifth possible implementation, the memory of the terminal may further comprise instructions to perform the following operations. Carry a request end identifier in each speech request packet and the request end identifier indicates whether the speech data segment carried in the speech request packet is the last segment of the speech stream.

As mentioned above, according to the terminal provided in the various embodiments, the terminal sends the server a speech request packet carrying the speech data segment, the offset position of the speech request packet in the speech stream and the data length of the speech data segment, and after received, the speech response packet that fed back by the server and carries the expected offset position and the expected data length, the terminal makes a determination for sending the next speech request packet according to this speech response packet. According to the above methods, the issue of the inaccurate processing results of the speech stream or the inability of the speech stream to be processed during the speech transmission due to packet loss, duplication, and disorder can be solved and avoided in the future.

Further, various embodiments provide a less flawed speech transmission mechanism, wherein within a predetermined time interval after the terminal sends a speech request packet, the terminal detects whether the speech response packet corresponding to the speech request packet has been received, and resends the speech request packet when it detects that the speech response packet corresponding to the speech request packet has not been received, thereby avoiding the influence due to the occurrence of the speech response packet loss.

It should be understood that, as used herein, unless the context clearly supports exceptions, the singular forms "a" ("a", "an", "the") are intended to include the plural forms. It should also be understood that, "and/or" used herein is intended to include any and all possible combinations of one or more of the associated listed items The embodiments of the present disclosure are only used for description, and do not represent the merits of the implementations.

Those with ordinary skilled in the art will understand that all or part of the steps to achieve the above-described embodiments may be accomplished by hardware, or by programs instructing relevant hardware, and the programs may be stored in a computer readable storage medium, the storage medium may be a read-only memory, magnetic or optical disk, etc.

The foregoing are only preferred embodiments of the present disclosure and are not intended to limit the present disclosure. Any modification, equivalent substitution, and improvement made within the spirit and principles of the present disclosure should be included in the protection scope of the present disclosure.

One skilled in the art may be aware that some exemplary instances of intelligent terminals and operating systems thereof are listed above in detail; however, such listing is merely provided for description, and is not intended to limit the protection scope of the implementation manners of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A speech transmission method performed by a server, the method comprising:
   receiving a first speech request packet of a plurality of speech request packets sequentially sent by a terminal, wherein each of the speech request packets carries (i) one speech data segment of a speech stream, (ii) an offset position of the speech data segment in the speech stream, and (iii) a data length of the speech data segment, and different speech request packets carry different identifiers added by the terminal when the terminal sends the speech request packets;
   generating a first speech response packet according to the first speech request packet, wherein the first speech response packet carries (i) an identifier corresponding to an identifier of the first speech request packet, (ii) an expected offset position and (iii) an expected data length, wherein the expected offset position is the expected offset position, in the speech stream, of a speech data segment in a next speech request packet that is received by the server and the expected data length is the expected length of the data of the speech data segment in the next speech request packet that is received by the server;
   feeding back the first speech response packet to the terminal;
   receiving from the terminal a second speech request packet of the plurality of speech request packets;
   determining, according to the offset positions and the identifiers of the first speech packet request and the second speech packet request, that there is a missing speech data segment;
   responsive to the determining:
      generating a first expected offset position according to the offset position, in the speech stream, of the missing data speech segment;

generating a first expected data length according to the data length of the missing data segment; and sending to the terminal a second speech response packet that includes the first expected offset position and the first expected data length of the missing data speech segment, thereby causing the terminal to resend the missing data speech segment;

receiving from the terminal a third speech request packet of the plurality of speech request packets;

determining, based on the offset position of the speech data segment of the third speech request packet, that the third speech request packet does not correspond to the missing data speech segment;

in accordance with the determining:
performing a sorting action to obtain a speech sequence for the received speech request packets;
re-generating the first expected offset position and the first expected data length; and
feeding back to the terminal a third speech response packet that includes the first offset position and the first data length.

2. The speech transmission method of claim 1, further comprising:
when it is determined that the speech sequence does not lack a speech data segment, generating an expected offset position according to an end position of the speech sequence and configuring the expected data length as a preset value.

3. The speech transmission method of claim 2, wherein each speech request packet carries a request end identifier, and the request end identifier denotes whether the speech data segment carried in the speech request packet is the last segment of the speech stream, the method further comprising:
adding 1 to the end position of the speech sequence to generate the expected offset position when all the received request end identifiers are False.

4. The speech transmission method of claim 1, further comprising:
detecting whether the speech data segment carried in the speech request packet is already received in other speech request packets; and
responsive to a determination that the speech data segment carried in the speech request packet is already received, performing a de-duplication process for the speech data segment carried in the speech request packet.

5. The speech transmission method of claim 1, each speech request packet carries a request end identifier, and the request end identifier denotes whether the speech data segment carried in the speech request packet is the last segment of the speech stream, the method further comprising:
adding a processing result of the speech stream into the speech response packet when the request end identifier carried in the speech request packet is True and all speech data segments of the speech stream have been received.

6. The speech transmission method of a claim 5, further comprising:
caching the processing result of the speech stream for a predetermined length of time.

7. A speech transmission method performed by a terminal, comprising:
sequentially sending to a server a first speech request packet of a plurality of speech request packet, wherein each of the speech request packets carries (i) one speech data segment of the speech stream, (ii) an expected offset position of the speech data segment in the speech stream and (iii) a data length of the speech data segment, and adding different identifiers to different speech request packets when sending the speech request packets;

receiving a first speech response packet from the server, wherein the first speech response packet corresponds to the first speech request packet and wherein the first speech response packet is generated by the server according to the first speech request packet and other received speech request packets corresponding to the speech stream; the first speech response packet carries (i) an identifier corresponding to an identifier of the speech request packet, (ii) an expected offset position and (iii) an expected data length, wherein the expected offset position is the expected offset position, in the speech stream, of a speech data segment in a next speech request packet that is received by the server; and the expected data length is the expected length of the data of the speech data segment in the next speech request packet that is received by the server;

sending to the server a second speech request packet and a third speech request packet of the plurality of speech request packets, wherein the server is configured to:
based on the offset position of the speech data segment of the third speech request packet, determine that the second speech request packet is missing;
perform a sorting action to obtain a speech sequence for the received speech request packets;
generating a first expected offset position and the first expected data length corresponding to the second speech request packet; and
feed back to the terminal a second speech response packet that includes the first offset position and the first data length receiving from the server the second speech response packet that includes the first expected offset position and the first expected data length;

determining, based on the first expected position and the first expected data length, that the second speech response packet is missing from the server; and responsive to the determining, re-sending to the server the second speech response packet.

8. The speech transmission method of claim 7, further comprising:
detecting whether the expected data length carried in the speech response packet equals to a predetermined value; and
when it is detected that the expected data length carried in the speech response packet does not equal to the predetermined value, carrying all or part of the speech data segment that has the expected offset position and expected data length in the next speech request packet for transmitting.

9. The speech transmission method of claim 8, wherein the expected data length carried in the speech response packet equals to a predetermined value, the method further comprising:
when it is detected that the expected data length carried in the speech response packet equals to the predetermined value, judging whether the speech data segment that has the expected offset position and expected data length carried in the speech response packet has been sent;
when it is judged that the speech data segment that has the expected offset position and expected data length carried in the speech response packet has been sent, and there is still a speech data segment of the speech stream that has not been sent, carrying the speech data segment in the next speech request packet for transmitting; and when it is judged that the speech data segment that has the expected offset position and expected data length carried in the speech response packet has not been sent yet and a speech data segment with the expected offset position exists in the speech stream, carrying the speech data segment with the expected offset position in the next speech request packet for transmitting.

10. The speech transmission method of claim 7, further comprising:

for each speech request packet, detecting whether a speech response packet corresponding to the received speech request packet is received, within a predetermined time interval after the speech request packet is sent; and resending the speech request packet when it is detected that the speech response packet corresponding to the speech request packet has not been received yet.

11. The speech transmission method of claim 7, further comprising:

carrying a request end identifier in each speech request packet, wherein the request end identifier indicates whether the speech data segment carried in the speech request packet is the last segment of the speech stream.

12. A speech transmission apparatus, comprising: a processor and memory in communication with the processor, the memory storing one or more instructions which, when executed by the processor, cause the speech transmission apparatus to perform operations comprising:

receiving a first speech request packet of a plurality of speech request packets sequentially sent by a terminal, wherein each of the speech request packets carries (i) one speech data segment of a speech stream, (ii) an offset position of the speech data segment in the speech stream, and (iii) a data length of the speech data segment, and different speech request packets carry different identifiers added by the terminal when the terminal sends the speech request packets;

generating a first speech response packet according to the first speech request packet, wherein the first speech response packet carries (i) an identifier corresponding to an identifier of the first speech request packet, (ii) an expected offset position and (iii) an expected data length, wherein the expected offset position is the expected offset position, in the speech stream, of a speech data segment in a next speech request packet that is received by the server and the expected data length is the expected length of the data of the speech data segment in the next speech request packet that is received by the server;

feeding back the first speech response packet to the terminal;

receiving from the terminal a second speech request packet of the plurality of speech request packets;

determining, according to the offset positions and the identifiers of the first speech packet request and the second speech packet request, that there is a missing speech data segment;

responsive to the determining:

generating a first expected offset position according to the offset position, in the speech stream, of the missing data speech segment;

generating a first expected data length according to the data length of the missing data segment; and sending to the terminal a second speech response packet that includes the expected offset position and the expected data length of the missing data speech segment, thereby causing the terminal to resend the missing data speech segment;

receiving from the terminal a third speech request packet of the plurality of speech request packets;

determining, based on the offset position of the speech data segment of the third speech request packet, that the third speech request packet does not correspond to the missing data speech segment;

in accordance with the determining:

performing a sorting action to obtain a speech sequence for the received speech request packets;

re-generating the first expected offset position and the first expected data length; and feeding back to the terminal a third speech response packet that includes the first offset position and the first data length.

13. The speech transmission apparatus of claim 12, the one or more instructions further comprising:

when it is determined that the speech sequence does not lack a speech data segment, generating an expected offset position according to an end position of the speech sequence and configuring the expected data length as a preset value.

14. The speech transmission apparatus of claim 13, wherein each speech request packet carries a request end identifier, and the request end identifier denotes whether the speech data segment carried in the speech request packet is the last segment of the speech stream, the one or more instructions further comprising:

adding 1 to the end position of the speech sequence to generate the expected offset position when all the received request end identifiers are False.

15. The speech transmission apparatus of claim 12, the one or more instructions further comprising:

detecting whether the speech data segment carried in the speech request packet is already received in other speech request packets; and responsive to a determination that the speech data segment carried in the speech request packet is already received, performing a de-duplication process for the speech data segment carried in the speech request packet.

16. The speech transmission apparatus of claim 12, the one or more instructions further comprising:

adding a processing result of the speech stream into the speech response packet when the request end identifier carried in the speech request packet is True and all speech data segments of the speech stream have been received.

17. The speech transmission apparatus of claim 16, the one or more instructions further comprising:

caching the processing result of the speech stream for a predetermined length of time.

* * * * *